United States Patent
Khoury

(10) Patent No.: US 12,163,834 B2
(45) Date of Patent: Dec. 10, 2024

(54) MICRO WIDEBAND SPECTROSCOPIC ANALYSIS DEVICE

(71) Applicant: Jed Khoury, Sudbury, MA (US)

(72) Inventor: Jed Khoury, Sudbury, MA (US)

(*) Notice: Subject to any disclaimer, the term of this patent is extended or adjusted under 35 U.S.C. 154(b) by 0 days.

(21) Appl. No.: 16/964,001

(22) PCT Filed: Jan. 25, 2019

(86) PCT No.: PCT/US2019/015206
§ 371 (c)(1),
(2) Date: Jul. 22, 2020

(87) PCT Pub. No.: WO2019/147975
PCT Pub. Date: Aug. 1, 2019

(65) Prior Publication Data
US 2021/0033457 A1    Feb. 4, 2021

Related U.S. Application Data

(60) Provisional application No. 62/623,009, filed on Feb. 27, 2018, provisional application No. 62/622,760, filed on Jan. 26, 2018.

(51) Int. Cl.
*G01J 3/18* (2006.01)
*G01J 3/02* (2006.01)
*G01J 3/26* (2006.01)

(52) U.S. Cl.
CPC ........... *G01J 3/0256* (2013.01); *G01J 3/0208* (2013.01); *G01J 3/0227* (2013.01); *G01J 3/18* (2013.01); *G01J 3/26* (2013.01)

(58) Field of Classification Search
CPC ...... G01J 3/0256; G01J 3/0208; G01J 3/0227; G01J 3/18
See application file for complete search history.

(56) References Cited

U.S. PATENT DOCUMENTS

| 4,755,665 A | * | 7/1988 | Ulmer, Jr. | G01R 19/10 |
| | | | | 250/214 R |
| 2005/0264808 A1 | | 12/2005 | Wang | |

(Continued)

FOREIGN PATENT DOCUMENTS

| CN | 102338895 A | * | 2/2012 |
| CN | 103091749 A | * | 5/2013 |

(Continued)

OTHER PUBLICATIONS

Newport Corp, "Laser Beam Expander", https://www.youtube.com/watch?v=SK66JA5m4M8, May 1, 2015 (Year: 2015).*

(Continued)

*Primary Examiner* — Maurice C Smith
(74) *Attorney, Agent, or Firm* — Hamilton, Brook, Smith & Reynolds, P.C.

(57) ABSTRACT

According to some embodiments, a Micro Wideband Spectroscopic Analysis Device (MWSAD) is designed to operate from the visible to the far infrared. The MWSAD is the first unified platform to implement nearly all kind of molecular spectroscopy. This design is based on combining/integrating Diffractive Focusing Element (DFE) such as Fresnel lens/Zone plate with wide and finite range tuning devices. The wide range tuning devices are tunable lenses and/or a long stroke linear motor. The finite tuning devices are micro pinhole controlled by MEMS/PZT actuator. The MEMS/PZT actuator is used for finite tuning the micro pinhole location across the chromatic focuses of the Fresnel lens/DFE. The long stroke linear motor is used for wide range tuning the pinhole location across the chromatics focuses. The tunable lens is used for wideband tuning the chromatics focuses locations within the micro pinhole.

24 Claims, 10 Drawing Sheets

(56) References Cited

U.S. PATENT DOCUMENTS

| | | | |
|---|---|---|---|
| 2007/0081236 A1 | 4/2007 | Tearney et al. | |
| 2010/0039641 A1 | 2/2010 | Park et al. | |
| 2013/0286309 A1 | 10/2013 | Valley et al. | |
| 2014/0221753 A1* | 8/2014 | Tearney | A61B 1/0019 600/167 |
| 2015/0116815 A1* | 4/2015 | Park | G02B 26/004 359/291 |
| 2015/0205096 A1 | 7/2015 | Nam et al. | |
| 2017/0219909 A1 | 8/2017 | Galstian et al. | |
| 2017/0343477 A1 | 11/2017 | Santori et al. | |
| 2018/0252518 A1* | 9/2018 | Chalmers | G01B 11/0675 |

FOREIGN PATENT DOCUMENTS

| | | | | |
|---|---|---|---|---|
| CN | 2015513065 A | * | 4/2015 | |
| CN | 205003310 U | * | 1/2016 | |
| CN | 105319630 A | * | 2/2016 | |
| CN | 108241186 A | * | 7/2018 | G02B 3/14 |
| CN | 106767431 B | * | 4/2019 | |
| EP | 0768622 A2 | * | 4/1997 | G02B 21/0024 |
| GB | 1360691 A | | 7/1974 | |
| JP | 57-138613 A | | 8/1982 | |
| JP | 05-281041 A | | 10/1993 | |
| JP | 2007-509319 A | | 4/2007 | |
| JP | 2009-510451 A | | 3/2009 | |
| JP | 2012-027411 A | | 2/2012 | |
| WO | 2017/174514 A1 | | 10/2017 | |
| WO | WO-2020051975 A1 | * | 3/2020 | G01M 11/0264 |

OTHER PUBLICATIONS

Susumu Sato, "Liquid-Crystal Lens-Cells with Variable Focal Length", 1979 (Year: 1979).*

Jameco, "Liquid Crystals: The Story Behind the Technology"https://www.jameco.com/Jameco/content/liquid-crystal-display-technology.html#:~: text=In nature%2C liquid crystals aren, cellulose and even slug slime, Apr. 24, 2015 (Year: 2015).*

International Search Report and Written Opinion for International Application No. PCT/US2019015206 entitled "Micro Wideband Spectroscopic Analysis Device," Date of Mailing: Jun. 28, 2019.

International Preliminary Report on Patentability for International Application No. PCT/US2019015206 entitled "Micro Wideband Spectroscopic Analysis Device," Date of Mailing: Jun. 28, 2019.

* cited by examiner

MICRO WIDEBAND SPECTROSCOPIC ANALYSIS DEVICE

RELATED APPLICATIONS

This application is the U.S. National Stage of International Application No. PCT/US2019/015206, filed Jan. 25, 2019, which designates the U.S., published in English, and claims the benefit of U.S. Provisional Application No. 62/622,760, filed on Jan. 26, 2018 and U.S. Provisional Application No. 62/623,009, filed on Feb. 27, 2018. The entire teachings of the above applications are incorporated herein by reference.

BACKGROUND

Spectroscopy is divided into three main categories: mass spectroscopy, atomic microscopy, and molecular spectroscopy. The MWSAD in this invention related to molecular spectroscopies and, to some to optical atomic microscopy. Molecular spectroscopies include Raman, Infrared, UV-Visible, colorimetry NIR, Fourier Transform spectroscopy and fluorescence.

Most IR spectroscopies use Fourier Transform Infrared (FTIR) spectroscopic techniques that preferably require an interferometer with a moving mirror for analyzing a spectrum. A conversion algorithm for extracting the spectral data that follows the output data is preferably required. However, the other spectroscopic analysis devices/components rely on using a grating, prism, and Fabry-Pérot (FP) interferometer. Generally, grating-based spectral analysis has much higher resolving power than interferometer used in FTIR. FP is usually designed with very high resolving power. The basic designs of these kinds of spectroscopic techniques (or devices) have little in common. Grating-based spectrometers are distinguished by the number of grooves in the gratings. The number of grooves affects the spectrometer's resolving power. FTIR, grating-based, and Fabry-Pérot spectroscopies are completely different techniques and may not be combined due to fundamental differences in the way they operate.

SUMMARY

Embodiments are directed to a device and method.

In one embodiment, a device compromises a quasi chromatic focusing element configured to receive one or more spectroscopic input beams and configured to transmit at least a portion of light associated with the one or more spectroscopic input beams. The device includes a sequential optical device, and includes a movable or static light opening configured to receive the transmitted at least a portion of light and enable the at least a portion of transmitted light to be passed to the sequential optical device.

According to some embodiments, the device may include a movable or tunable lens configured to adjust a focal point location of the quasi chromatic focusing element. According to some embodiments, the sequential optical device may comprise at least one of a photosensor, collimating optics, and a Fabry-Perot interferometer device. The movable light opening comprises a pinhole or a slit. The quasi chromatic focusing element may include at least one of a Fresnel Lens, a Fresnel Zone Plate, a Photon Sieve, a Pinhole Sieve, and a Tunable Diffractive Focusing Element.

According to some embodiments, the device may comprise at least one of: (i) a tunable spatial notch filter configured to enable a spectral band to be transmitted from the at least a portion of the transmitted light, which may also remove scattering noise; and (ii) a collimating lens configured to collimate the at least a portion of the transmitted light, the collimating lens further configured to forward the collimated at least a portion of the transmitted light to a spectral analyzer, the spectral analyzer (such as a spectral analyzer including a Fabry-Perot interferometer device or other spectroscopic system) configured to analyze the at least a portion of the transmitted light.

According to some embodiments, the quasi chromatic focusing element may be configured to focus the at least a portion of the transmitted light within wideband operating conditions. The at least one of the quasi chromatic focusing element and the movable or tunable lens and photosensor may comprise at least one wideband material.

According to some embodiments, the device may include at least one further device configured to focus the at least a portion of the light through the movable light opening, the at least one further device including one or more of a tunable focus diffractive element, a piezo electric actuator, a Micro-Electro-Mechanical Systems (MEMS) light opening membrane, a DC linear motor, and a Micro-Electro-Mechanical Systems (MEMS) light opening photosensor. The DC linear motor can, for example, be a linear voice coil motor.

According to some embodiments, the movable light opening may be designed to have a diameter or width approaching the diffraction limit of the quasi chromatic focusing element configured to perform high resolution spectroscopic analysis. The device may include one or more further devices coupled to the photosensor, the one or more further devices including an electronic amplifier, a cooling device, an optical detector, an electronic amplifier, and a cooling device.

According to some embodiments, at least one of the quasi chromatic focusing element and the movable or tunable lens comprises wideband transmitting materials. The movable or tunable lens may include at least one of wideband transparent windows, wideband transparent conductive electrodes, a wideband transparent convex lens, and a wideband transparent liquid crystal, wideband liquid materials, wideband liquid fluids, a tunable diffractive focusing element, an electrowetting lens, and a liquid crystal lens.

According to some embodiments, the Micro-Electro-Mechanical Systems (MEMS) light opening photosensor may be coupled to a Micro-Electro-Mechanical Systems (MEMS) pinhole device. The movable or tunable lens may be configured to perform wideband tuning of the at least a portion of the transmitted light. The DC linear motor, which can for example, be a linear voice coil motor, may be configured to enable wideband tuning of the at least a portion of the transmitted light. The piezo electric actuator may be configured to enable fine tuning of the at least a portion of the transmitted light. The Micro-Electro-Mechanical Systems (MEMS) light opening photosensor may be configured to enable fine tuning of the at least a portion of the transmitted light.

According to some embodiments, the one or more input beams may include one or more probe beams of the following types: laser Raman Scattering, Infrared absorption, Infrared reflection, Ultraviolet-Visible (UV-Vis) absorption, Ultraviolet-Visible (UV-Vis) reflection, florescence scattering, and colorimetry beams. The movable or tunable lens may be configured to align the at the at least a portion of the transmitted light through the movable light opening. The notch filter may be a tunable notch-spatial filter configured to perform a further stage of spectroscopy.

According to another embodiment, a device includes a sieve optical element including a photon sieve or pinhole sieve. The sieve optical element is configured to receive one or more spectroscopic input beams and transmit at least a portion of light associated with the one or more spectroscopic input beams. The device includes a photosensor configured to receive the at least a portion of transmitted light. The device includes a movable light opening configured to enable the photosensor to receive the at least a portion of transmitted light.

In further, related embodiments, the device may include a movable or tunable lens configured to adjust a focal point location of the sieve optical element. The movable light opening may comprise a pinhole or a slit. The quasi chromatic focusing element may comprise at least one of a Fresnel Lens, a Fresnel Zone Plate, a Photon Sieve, a Pinhole Sieve, and a Tunable Diffractive Focusing Element.

According to some embodiments, the device may include at least one of: (i) a tunable spatial notch filter configured to enable a spectral band to be transmitted from the at least a portion of the transmitted light, which may also remove scattering noise; and (ii) a collimating lens configured to collimate the at least a portion of the transmitted light, the collimating lens further configured to forward the collimated at least a portion of the transmitted light to a spectral analyzer, the spectral analyzer (such as a spectral analyzer including a Fabry-Perot interferometer device or other spectroscopic system) configured to analyze the at least a portion of the transmitted light.

According to some embodiments, the quasi chromatic focusing element may be configured to focus the at least a portion of the transmitted light within wideband operating conditions. At least one of the quasi chromatic focusing element and the movable or tunable lens and photosensor may comprise at least one wideband material.

According to some embodiments, the device may include at least one further device configured to focus the at least a portion of the light through the movable light opening. The at least one further device may include one or more of a tunable focus diffractive element, a piezo electric actuator, a Micro-Electro-Mechanical Systems (MEMS) light opening membrane, a DC linear motor, a Micro-Electro-Mechanical Systems (MEMS) light opening photosensor, and a movable or tunable lens.

According to some embodiments, the movable light opening may be designed to have a diameter or width approaching the diffraction limit of the quasi chromatic focusing element configured to perform high resolution spectroscopic analysis. The device may further include one or more further devices coupled to the photosensor. The one or more further devices may include at least one of an electronic amplifier, a cooling device, an optical detector, an electronic amplifier, and a cooling device.

According to some embodiments, at least one of the quasi chromatic focusing element and the movable or tunable lens comprises wideband transmitting materials. The movable or tunable lens may include at least one of wideband transparent windows, wideband transparent conductive electrodes, a wideband transparent convex lens, and a wideband transparent liquid crystal, wideband liquid materials, wideband liquid fluids, a tunable diffractive focusing element, an electrowetting lens, and a liquid crystal lens.

According to some embodiments, the device may further comprise a movable or tunable lens configured to adjust a focal point location of the sieve optical element wherein at least one of: the Micro-Electro-Mechanical Systems (MEMS) light opening photosensor is coupled to a Micro-Electro-Mechanical Systems (MEMS) pinhole device; the movable or tunable lens is configured to perform wideband tuning of the at least a portion of the transmitted light; the DC linear motor is configured to enable wideband tuning of the at least a portion of the transmitted light; the piezo electric actuator is configured to enable fine tuning of the at least a portion of the transmitted light; and the Micro-Electro-Mechanical Systems (MEMS) light opening photosensor is configured to enable fine tuning of the at least a portion of the transmitted light.

According to some embodiments, the one or more input beams may include one or more probe beams of the following types: laser Raman Scattering, Infrared absorption, Infrared reflection, Ultraviolet-Visible (UV-Vis) absorption, Ultraviolet-Visible (UV-Vis) reflection, florescence scattering, and colorimetry beams. The movable or tunable lens may be configured to align the at the at least a portion of the transmitted light through the movable light opening. The notch filter may be a tunable notch-spatial filter configured to perform a further stage of spectroscopy.

According to some embodiments, the optical sieve may be configured to perform wideband spectroscopy and one or more pinholes of the optical sieve have one or more outer rings that are associated with a longer wavelength than one or more inner rings of the optical sieve.

In a further embodiment, there is provided a wideband tunable spatial noise filter. The wideband tunable spatial noise filter includes a quasi chromatic focusing element configured to receive one or more spectroscopic probe input beams. The spectroscopic analysis device includes a light opening configured to enable the quasi chromatic focused light to pass through the light opening itself. The spectroscopic analysis device includes a focusing module configured to control focus of the light passed through the light opening.

In further, related embodiments, the wideband tunable spatial noise filter may comprise at least a portion of a spectroscopic analysis device configured to perform one stage of spectroscopy, further comprising a photosensor configured to detect the light passed through the light opening.

According to some embodiments, the wideband tunable spatial noise filter may include a notch filter configured to enable the quasi chromatic focusing element to focus and transmit light associated with the one or more spectroscopic probe input beams. The one or more spectroscopic probe input beams may include at least one spectral band.

According to some embodiments of the wideband tunable spatial noise filter, the focusing module may include at least one of tunable lenses, a tunable diffractive element, a piezoelectric actuator, direct-current (DC) motor, and a pinhole Micro-Electric Mechanical System (MEMS).

Some embodiments of the wideband tunable spatial noise filter may comprise at least a portion of a spectroscopic analysis device configured to perform two stages of spectroscopy, and may further include collimating optics configured to collimate the quasi chromatic light passed through the light opening, the collimating lens configured to enable spectral analysis. Some embodiments of the spectroscopic analysis device may include a Fabry-Perot interferometer device configured to perform the spectral analysis.

According to some embodiments, the spectroscopic analysis device comprises a spectroscopic probe input beam, a notch filter for allowing a spectral band to be transmitted, and alight opening for allowing specific quasi chromatic focused light to pass through the light opening. The device also comprises at least one means for controlling the quasi chromatic focuses element focuses through the light opening, a photosensor for detecting the light transmitted through the light opening, a collimating lens for collimating the quasi chromatic light transmitted through the light opening for second stage of spectral analysis, and a Fabry-Perot interferometer device a second stage spectral analysis. The quasi chromatic focusing element wherein said selected at least one member of a group comprising: Fresnel Lens, Fresnel Zone Plate, Photon Sieve, Pinhole Sieve, Tunable Diffractive Focusing Element. The chromatic focusing element for wideband operating conditions can, for example comprise a material including at least one member of the group consisting of: Zinc Selenide (ZnSe) (0.45 µm and 21.5 µm), Barium Fluoride (BaF$_2$) (0.18-14 µm) Calcium Fluoride (CaF$_2$) (0.18-11.5 µm) Potassium Chloride (0.21-20 µm), Sodium Chloride (NaCl) 0.25-16 µm, Cesium Iodide (Csl) (0.25-55 µm) and diamond (0.225-THz), and organic materials including but not limited to Polyethylene, Polyvinylidene fluoride (pvdf) and PMMA.

According to some embodiments, the means for controlling the quasi chromatic focusing element focuses through light opening which can be at least one member of the group consisting of: tunable lens, tunable focus diffractive element, piezo electric actuator, MEMS with light opening membrane, DC linear motor and MEMS light opening photosensor integrated.

According to some embodiments, the light opening is designed with a diameter approaching the diffraction limit of the chromatic focusing element for achieving high resolution spectroscopic analysis.

According to some embodiments, the photosensor is selected from wideband operating brand material.

According to some embodiments, the photosensor for achieving wideband spectral response can be at least one member of the group consisting of: tunable hybrid pyro detectors (0.1 to 1000 µm), thermopile detectors (300 µm; PbS detector (150 nm-2.6µ); PbSe detector (150 nm-4.6µ); and InGaAs (0.9-1.6µ). The photosensor for high sensitivity is integrated with an electronic amplifier and is integrated with a cooling device or system, and comprises an optical detector, electronic amplifier and cooling device or system.

According to some embodiments, the Wideband Liquid crystal lens compromises wideband transparent windows wherein said selected at least one member of a group comprises, Zinc Selenide (ZnSe) (0.45 µm and 21.5 µm), Barium Fluoride (BaF$_2$) (0.18-14 µm) Calcium Fluoride (CaF$_2$) (0.18-11.5 µm) Potassium Chloride (0.21-20 µm), Sodium Chloride (NaCl) 0.25-16 µm, Cesium Iodide (Csl) (0.25-55 µm) diamond (0.225-THz), Organic materials include but are not limited to Polyethylene, Polyvinylidene fluoride (pvdf) and PMMA.

According to some embodiments, Conductive electrodes wherein said selected at least one member of a group comprising tin doped indium oxide (ITO), fluorine-doped tin oxide (FTO), aluminum zinc oxide (AZO), aluminum zinc oxide (AZO). ZnO, Doped diamond, carbon nano tubes, graphene and graphene oxide.

According to some embodiments, A convex lens wherein said selected from group including Zinc Selenide (ZnSe) (0.45 µm and 21.5 µm), Barium Fluoride (BaF$_2$) (0.18-14 µm) Calcium Fluoride (CaF$_2$) (0.18-11.5 µm) Potassium Chloride (0.21-20 µm), Sodium Chloride (NaCl) 0.25-16 µm, Cesium Iodide (Csl) (0.25-55 µm) diamond (0.225-THz), Organic materials include but are not limited to Polyethylene, Polyvinylidene fluoride (pvdf) and PMMA. The Wideband Liquid crystal lens contains liquid crystal wherein said selected at least one member of a group comprising Azobenzene liquid crystals, Azobenzene monomers, Chiral azobenzene dyes, Photoalignment materials, Fast azobenzene liquid crystals with enhanced, e PAAD azobenzene.

According to some embodiments, the Fabry-Perot interferometer device for a second phase of spectral analysis wherein said to be integrated with the photosensor.

According to some embodiments, the MEMS pinhole device wherein said to be integrated with the photosensor.

According to some embodiments, the tunable lens may be for wideband tuning, the DC linear motor is wherein said for wideband tuning, and the piezo electric actuator is wherein said for fine tuning. The MEMS light opening is wherein said for ultrafine tuning.

According to some embodiments, the Sieves for a wideband spectroscopy may be said that the pinholes at the outer side rings is in the order of the longest wavelength used for the spectroscopy. The input beam may combine at least one probe beam of a group comprising, probe beam from laser Raman Scattering, probe beam from IR absorption, probe beam of UV-VIS absorption, probe beam from florescence scattering.

According to some embodiments, the light opening may be located on a means for transvers controlling aligning the quasi chromatic light focuses to pass. The tunable notch-spatial filter for second stage of spectroscopy compromises light opening for allowing specific quasi chromatic focused light to pass through the light opening, and at least one mean for controlling the quasi chromatic focuses element focuses through the light opening. The tunable notch-spatial filter compromises light opening for allowing specific quasi chromatic focused light to pass through the light opening at least one means for controlling the quasi chromatic focuses element focuses through the light opening According to some embodiments, the input beam may combine at least one probe beam of a group comprising, probe beam from laser Raman Scattering, probe beam from IR absorption, probe beam of UV-VIS absorption, probe beam from florescence scattering.

Embodiments may include one or more of the following:
Light Opening
  Pinhole for spherical optics
  Slit for cylindrical optics
Quasi Chromatic Focusing Element
  Fresnel lens
  Photon Sieve
  Pinhole sieve
Stretchable versions of all the above
Functions as both Quasi chromatic focusing element and a means for controlling the quasi chromatic focusing element focuses through the light opening
Means for Controlling the Quasi Chromatic Focusing Element Focuses Through the Light Opening
  Tunable lenses
  Liquide crystal lens
  Electrowetting lens
  Zoom lens, such as a voice coil tunable lens
  Stretchable diffractive element
  Piezo electric crystal (µ-100µ)
  Pinhole MEMS (micro electromechanical system) (or the best few microns)
  Linear DC motor (cm)

According to some embodiments, the MEMS pinhole device may be integrated with the photosensor, the tunable lens for wideband tuning, the DC linear motor may be for wideband tuning, the piezo electric actuator may be said for fine tuning, the MEMS light opening may be for ultrafine tuning.

According to some embodiments, the photosensor material may be selected from wideband operating brand material (7) The photosensor for achieving wideband spectral response is wherein said selected at least one member of a group comprising: tunable hybrid pyro detectors (0.1 to 1000 µm), thermopile detectors (300 µm; PbS detector (150 nm-2.60; PbSe detector (150 nm-4.60; and InGaAs (0.9-1.6µ). (8) The photosensor for high sensitivity is integrated with an electronic amplifier (9) The photosensor is integrated with cooling device (10) The photosensor is integrated with cooling device (11) The photosensor in claim 7 compromises optical detector, electronic amplifier and cooling system or device. (12) Wideband Liquid crystal lens compromises (a) Wideband transparent windows wherein said selected at least one member of a group comprising, Zinc Selenide (ZnSe) (0.45 µm and 21.5 µm), Barium Fluoride (BaF$_2$) (0.18-14 µm) Calcium Fluoride (CaF$_2$) (0.18-11.5 µm) Potassium Chloride (0.21-20 µm), Sodium Chloride (NaCl) 0.25-16 µm, Cesium Iodide (CsI) (0.25-55 µm) diamond (0.225-THz), Organic materials include but are not limited to Polyethylene, Polyvinylidene fluoride (pvdf) and PMMA. (b) Conductive electrodes wherein said selected at least one member of a group comprising tin doped indium oxide (ITO), fluorine-doped tin oxide (FTO), aluminum zinc oxide (AZO), aluminum zinc oxide (AZO). ZnO, Doped diamond, carbon nano tubes, graphene and graphene oxide. (c) Convex lens wherein said selected from group including Zinc Selenide (ZnSe) (0.45 µm and 21.5 µm), Barium Fluoride (BaF$_2$) (0.18-14 µm) Calcium Fluoride (CaF$_2$) (0.18-11.5 µm) Potassium Chloride (0.21-20 µm), Sodium Chloride (NaCl) 0.25-16 µm, Cesium Iodide (CsI) (0.25-55 µm) diamond (0.225-THz), Organic materials include but are not limited to Polyethylene, Polyvinylidene fluoride (pvdf) and PMMA.

According to some embodiments, a Micro Wideband Spectroscopic Analysis Device (MWSAD) may be designed to operate from the visible to the far infrared. The MWSAD is the first unified platform to implement nearly all kinds of molecular spectroscopy. This design is based on combining/integrating Diffractive Focusing Element (DFE) such as Fresnel lens/Zone plate, Photon Sieve, Pinhole Sieve with wide and finite range tuning devices.

According to some embodiments, for monochromatic light, DFE has several orders of focal points with an increasing resolution as the focal order increases. For chromatic (or quasi chromatic) light, each focal point is dispersed to multi chromatic (or quasi chromatic) focuses. At the average focal point among the chromatic (or quasi chromatic) focuses of the DFE, a pinhole with a diameter in the order of DFE's diffraction limit is located. By adjusting the pinhole location across the chromatic focal points location, it is possible to analyze the light into its spectral components. The pinhole location is adjusted by using wide and finite tuning devices.

According to some embodiments, the tunable lens, Piezo electric crystal, the pinhole MEMS membrane, DC linear motor are all means for controlling the chromatic focuses element focuses through the pinhole or light opening.

According to some embodiments, the wide range tuning devices are tunable lenses and/or a long stroke linear motor. The finite tuning devices are micro pinhole controlled by the MEMS/PZT actuator. The MEMS/PZT actuator is used for finite tuning the pinhole location across the chromatic (or quasi chromatic) focuses of the DFE. This is appropriate for the application involving Raman spectroscopy. The long stroke linear motor is used for wide range tuning the micro pinhole location across the chromatic (or quasi chromatic) focuses. The tunable lens is used for wideband tuning the chromatic (or quasi chromatic) focuses locations within the micro pinhole. The wide tuning devices are suitable for application involving UV-Vis, Colorimetry, Fluorescents, atomic spectroscopies atomic and IR spectroscopy.

According to some embodiments, the DFE combined with a pinhole at any of the chromatic (or quasi chromatic) focal points operates as a spatial noise filter, as well as a Notch filter for another part of the spectrum. Combining the DFE with a tunale lens creates the combination of a tunable Notch/spatial filter. This feature of this combination is very important for mitigating fluorescence and Rayleigh scattering in Raman spectroscopy applications. Therefore combing/integrating a Notch filter for a specific wavelength with the MWSAD becomes optional.

According to some embodiments, in more advanced design, the MWSAD is employed as a tunable Notch filter for micro Fabry-Pérot interferometer device. The combination of the MWSAD with a Fabry-Pérot interferometer device produces very a high resolving power Wideband Spectroscopic Analysis Device. The resolving power is in the order of $10^{11}$ According to some embodiments, DFE with an extremely high resolution and operating band between 300 nm-20 µm is designed for this device. The preferred materials for DFE are Zinc Selenide (transmittance window between 0.45 µm-21.5 µm), and Potassium Chloride (0.21-20 µm). Another set of materials are discussed later in this invention. If the DFE is Photon Sieve or Pinhole Sieve, then the DFE can be fabricated by drilling holes on a sheet of opaque materials. Any metal can be appropriate for this purpose.

According to some embodiments, two kinds of tunable lenses with a wide operating band between the UV and the far infrared are considered for wide band operation of the MWSAD. One of the lenses is based on electrowetting technology and the other one is based on liquid crystal technology. Any other tunable lenses can be considered if the lens provides enough tunability for the specific spectroscopic implementation.

According to some embodiments, high-sensitivity hybrid pyro detectors are the preferred selection of the photo sensors. Today, high-sensitivity hybrid pyro detectors with an integrated operational amplifier, cooler, and a detection range from 0.1 to 1000 µm are available commercially.

According to some embodiments, if Cesium Iodide (CsI) operating band 0.25-55 µm is the preferred material for both DFE and the tunable lens's windows, then the MWSAD operating range becomes between 0.25-55 µm. Diamond can be an alternative to extremely wideband operating conditions ranging between 0.225-THz.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

According to some embodiments.

According to some embodiments.

According to some embodiments.

According to some embodiments.

According to some embodiments.

According to some embodiments.

According to some embodiments.

According to some embodiments.

According to some embodiments.

DETAILED DESCRIPTION

Figure 1A:
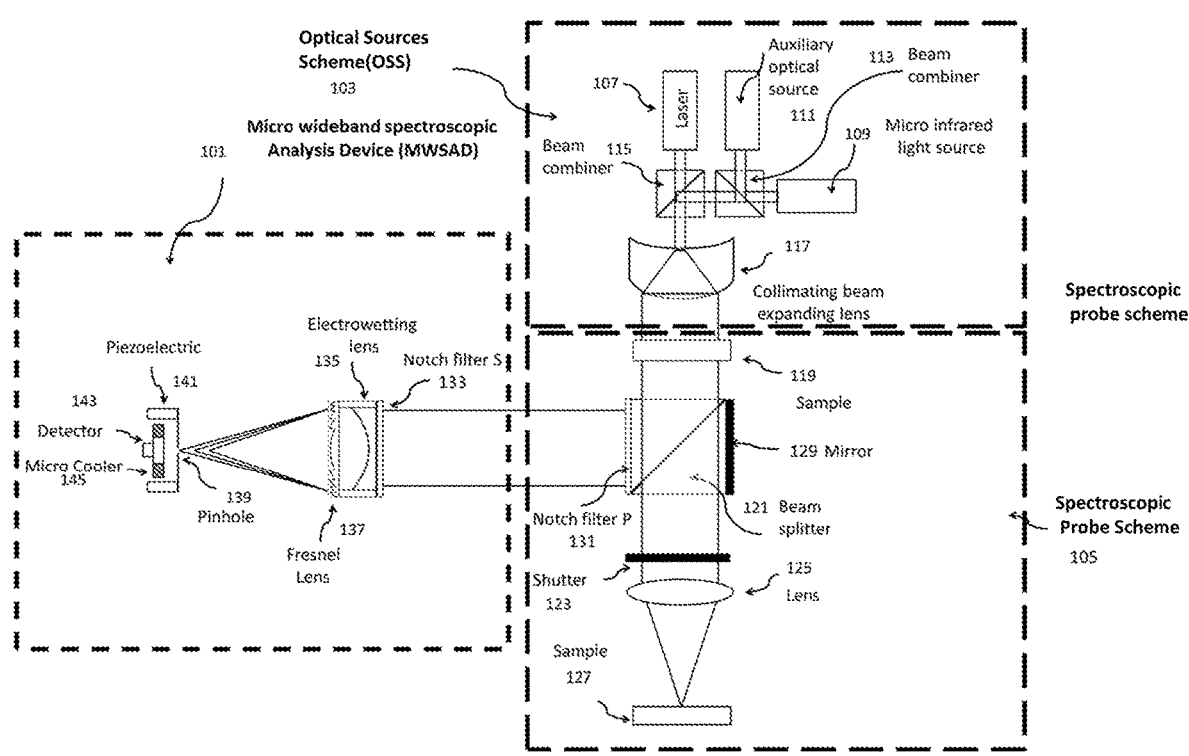
FIG. 1A: Schematic description of a MWSAD spectrometer, according to some embodiments.

A description of example embodiments follows.

Spectroscopy is a technique used in several industrial sectors, government agencies, and academic institutions. Applications of spectroscopy include quality assurance, testing, diagnosis, and characterization. Spectroscopic instruments are used in a wide range of industries, including petrochemicals, pharmaceuticals, polymers, defense, homeland security, chemicals, geology, food, soil, environmental and agriculture.

This work involves designing a Micro Wideband Spectroscopic Analysis Device (MWSAD) for performing spectroscopy over a very wideband of the spectrum ranging from the UV to far infrared.

When a spectroscopic system is designed with MWSAD of this invention, it can function with all kinds of molecular spectroscopes such as Raman, IR, UV-Vis spectroscopy, colorimetry, and fluorescence spectroscopy. It is possible to use more than one optical source that allows this MWSAD to function as a spectrometer for different purposes; it's also possible to use the MWSAD with light from external sources. The MWSAD is based on combining focusing diffractive element (DFE) with various technologies of tuning devices for achieving both fine and wideband tunability.

A Micro Wideband Spectroscopic Analysis Device (MWSAD) is designed to operate from the visible to the far infrared. The MWSAD is the first unified platform to implement nearly all kind of molecular spectroscopy. This design is based on combining/integrating Diffractive Focusing Element (DFE) such as Fresnel lens/Zone plate with wide and finite range tuning devices. The wide range tuning devices are tunable lenses and/or a long stroke linear motor. The finite tuning devices are micro pinhole controlled by MEMS/PZT actuator. The MEMS/PZT actuator is used for finite tuning the micro pinhole location across the chromatic focuses of the Fresnel lens/DFE. The long stroke linear motor is used for wide range tuning the pinhole location across the chromatics focuses. The tunable lens is used for wideband tuning the chromatics focuses locations within the micro pinhole. An optical Notch filter is optionally integrated within the device in order of avoiding florescence and Rayleigh scattering for Raman spectroscopy applications. The MWSAD is employed as a tunable Notch filter for micro Fabry-Pérot interferometer device. The combination of the MWSAD with Fabry-Pérot interferometer produces the first high resolving power wideband spectroscopic analysis device. Focusing diffractive element with an extremely high resolution and operating band between 300 nm-20 μm is designed for this device.

A Micro Wideband Spectroscopic Analysis Device (MWSAD) is designed to operate from the visible to far infrared. This design is based on combining/integrating diffractive focusing element (DFE) such as Fresnel lens/Zone plate with at least one actuator. In two actuators design, one of the actuators is for finite tuning of the location of the quasi chromatic focuses within the pinhole and the other actuator is for wideband tuning quasi chromatic focuses within the micro pinhole. The finite actuator is actuating pinhole membrane or PZT controlled micro pinhole. The wideband actuator is DC linear motor with a long stroke for controlling micro pinhole position or a tunable lens for adjusting quasi chromatic focuses of DFE within the pinhole. The tunable lens may be any tunable lens known to one skilled in the art and is not limited to any brand of tunable lenses.

Focusing Diffractive Element (DFE) such as Fresnel Zone Plate with an extremely high resolution and operating band between 300 nm-20 μm is designed for this device. The DFE is optionally integrated with a notch filter in order of avoiding fluorescence and Rayleigh scattering for Raman spectroscopy applications. When the spectrometer is implemented with MWSAD becomes the first unified platform to implement nearly all kinds of molecular spectroscopy, and perform spectroscopy ranging from the UV to the far infrared.

The finite tunability is suitable for the short wavelengths spectroscopes such as Raman, UV-Vis and fluorescence. On the other hand, the wide range tunability is suitable for IR spectroscopy. Furthermore; the finite tunability allows the user to increase (zoom) the resolution at any wavelength.

MWSAD enable design of spectrometer small and very accurate. This can be achieved because (a) the device facilitates the combination and fusion of spectroscopic data from different sources, including Raman, infrared, fluorescent, visible, and ultraviolet; (b) the device operates as a wavelength tunable notch filter; and (c) the device functions as a spatial scattering noise filter. These features are extremely important for all spectroscopies, in particular Raman, when the signal is corrupted by spatial noise and other spectral noise such as Rayleigh scattering.

Unlike FTIR spectroscopy, MWSAD based spectroscopy is used directly for IR spectroscopy and does not require an algorithm for converting the output data to the corresponding spectral components.

The MWSAD based spectroscopy can function with all kind of molecular spectroscopies, including Raman, IR, UV-Vis, colorimetry, and fluorescence. This is achieved by combining the MWSAD with any optical source operating from UV to IR or any of their combination with appropriate electronic driver and probing cell.

If the MWSAD based spectroscopy is used to analyze scattered light undergoing Raman scattering, it functions as a Raman spectrometer. If it is used to analyze white lights that undergo interactions with samples, it can be used as a UV-Vis spectrometer and calorimeter. If the MWSAD based spectrometer is used to analyze fluorescent light, it can function as a fluorescence spectrum analyzer. If it is used with IR sources, it can be used for infrared spectroscopy. The MWSAD can be designed with several input channels to simultaneously analyze all forms of molecular spectroscopy. The MWSAD can be as small as a fingertip and encapsulated in a flash memory enclosure. When MWSAD is combined with optical sources, it can be integrated into a handheld system.

To evaluate the significance of the MWSAD in different brands of spectroscopies, here is a short summary of different kind of spectroscopies:

Raman, NIR, and Infrared spectroscopies essentially are vibrational and rotational spectroscopies and often complement each other.

Raman spectroscopy uses highly monochromatic visible (or quasi chromatic) or near IR sources to probe the samples. In contrast, FTIR spectroscopy uses a very wideband IR source to probe the samples and then, after interacting with the samples, analyzes the probe light with interferometry. Thus, it makes sense to combine IR and Raman spectroscopy into one spectrometer that provides the advantages of both Raman and FTIR.

UV-Vis and Colorimetry spectroscopies are absorptive spectroscopies; both use wideband light sources to probe the samples. The difference between the two is that colorimetry is limited to the visible spectrum, while UV-Vis is more extended in both the UV and the near IR part of the spectrum. Thus, it makes sense to combine these two spectroscopies into one by using this subsystem with a wideband light source.

Fluorescents and atomic microscopies are similar to UV-Vis spectroscopy; the main difference is that they do not use broad white light sources to probe a sample but instead take broadband light from an external sample. In fluorescent microscopy, the samples are excited by UV illumination. In atomic microscopy, the materials are agitated by flame or other methods. Thus it makes sense to include light couples from an external source.

Today, there is no a single platform that can perform all of the optical spectroscopies in one instrument. A portable spectroscopic system/tester based on MWSAD with appropriate probes that combine the capabilities of vibrational, absorptive, fluorescent, and atomic spectroscopies should have a huge impact on all of the industries using spectroscopy instruments. This spectrometer may save time in quality assurance testing, provide higher accuracy in analysis, save cost and space, and improve delivery usage flexibility.

Advanced Security Technologies (AST) personnel can use the spectrometer to detect and offset explosives without approaching them. In hazardous environments, it can be used to remotely identify contaminated areas without exposing inspectors to health problems. In military applications, the spectrometer can be installed on guns for hyperspectral remote target indications; in homeland security, it can be used by security personnel for further inspections of suspicions items. In crop- and environmental-monitoring applications, it can easily be installed on unmanned aerial vehicles (UAVs).

Lastly, the MWSAD can be integrated with all varieties of light sources, or can be combined with their accessories to make the system suitable for consumer needs. The hardware-software drivers for the spectrometer can be designed to include Bluetooth and Wi-Fi technologies for remote transfer of data.

According to some embodiments, FIG. 1A shows a spectroscopic system based on the MWSAD for multi-purpose spectroscopic applications. This implementation includes both IR and Raman spectroscopy. The implementation of a full spectrometer contains three schemes: (a) micro wideband spectral analysis device (MWSAD) (101) (b) The optical sources scheme (OSS) (103) (c) The spectroscopic probe scheme (SPS) (105). These schemes/devices are capable of disassembling for integration the MWSAD with other probes and electronics for other specialized designs.

According to some embodiments, the Optical Sources Scheme (OSS) may include a laser (107), a wideband infrared source (109), an auxiliary optical source (111), beam combiners (113) (115), and a beam expander (117). The OSS can include more than one auxiliary source, and the sources can be either internal or external. The auxiliary optical source can be a wideband white light source for applications involved in colorimetry or UV-Vis spectroscopy. The auxiliary optical sources can be the samples' UV excitation light source for applications involved in fluorescent spectroscopy. The auxiliary optical source can also come from an external source for applications involving atomic spectroscopy or remote sensing applications.

The beams from the sources are combined, collimated, and expanded into one beam. The expanded beam is used as an input for the spectroscopic probe scheme (SPS) (105). In the probing scheme, the beam passes through the sample's container (119), the beam splitter (121), a shutter (123) lens (125) and ends at the sample container (127). The sample can be tested in either container (119) or container (117), but not both at the same time. Testing a sample in container (119) is suitable for transmission testing, while testing the sample in container (127) is more suitable for back scattering or reflection. The sample container can be, for example, cuvette. Today, there is a variety of cuvette for the UV, visible, infrared spectrum. The cuvette determines the operating band of this system. For wideband operating of this spectrometer it is preferred to use cuvette that has wideband spectral transmittance. Also, there is a cuvette holder with an input that is focused on the sample from a fiber while the output is coupled to other fiber. The output from the fiber can be collimated using fiber collimator before is entering into the Micro Wideband Spectral Analysis Device (MWSAD) and before being used the other sample.

Another alternative regarding the cuvette is to design cuvette with facets from the different material; each facet corresponds to a different band of the spectrum.

If the probing scheme (SPS) is used to probe a sample in the transmission container, then the beam that is reflected out of the beam splitter (121) should be collected at the output, while the transmitted beam through a beam splitter (121) should be blocked by the shutter (123). If the probing scheme is used in the reflection, then the reflected beam out of the container (127) should be collected at the output after the two reflections: The first is caused by the beam splitter (121) and the second is caused by the integrated mirror on the beam splitter (129). At the output (SPS) there is a Notch Filter (131) to get rid of the unnecessary light. The Notch Filter should be easy to assemble or disassemble form the SPS as needed.

The output from the probe system is collected MWSAD (101). The MWSAD contains: an optional Notch Filter (133), tunable lens preferred to be an electrowetting lens[18, 19] (135), a diffractive optical element (137) (in this case is Fresnel lens[20]) micro-pinhole (139), the piezoelectric actuator (141), a detector (143) and a micro cooler[21] (145). The Notch Filter is not necessary if is already assembled by the (SPS).

The Fresnel lens (137) is basically concentric prisms which focus different light wavelengths at different focal points, while the tunable lens (135) has the ability to tune the focal length simply by applying a voltage to the lens. At the first focal point of the lens, there is a pinhole (139) that is mounted on the piezoelectric actuator (141). The light transmitted through the pinhole is detected by a cooled, wideband high sensitivity detector (143). The detector is cooled by the micro cooler (145). These detectors are discussed further below. The Fresnel lens (137) can be replaced by any diffractive focusing element (DFE) such as Fresnel Zone plate, Photon Sieve or Pinhole Sieve.

The tunable lens (135) has the ability to tune the focal length of the structure's lens over a large distance (many centimeters), while the piezo actuator (141) is able to move the pinhole a few microns across the focal points (139). The finite tunability uses the PZT actuator (141) to make the MWSAD (101) suitable for UV-Vis, Raman, IR and fluorescent spectroscopies. The wide range tunability uses the tunable lens and makes the MWSAD suitable for mid and far infrared spectroscopy (as an alternative to Fourier transform spectroscopy). For the system of this invention to function as Raman spectrometer, it is enough to actuate the piezoelectric transducer across adjacent chromatic (or quasi chromatic) focal points. When using the system for IR spectroscopy, the visible laser should be switched off while the wideband IR source switches on.

For the device to be operating in both infrared and visible spectrum, it is better to replace the Fresnel lens by a diffractive optical means such as Fresnel zone plate or Photon-Sieve[22,23]. Fresnel zone plate is basically a binary version of the Fresnel lens with opaque and transparent rings. The Photon-Sieve is a diffractive optics means device. It may include a flat sheet of material which is full of pinholes that are arranged in a pattern that is similar to the rings in a Fresnel zone plate. Both the Fresnel Zone plate and Photon-Sieve should be fabricated on a wideband transparent substrate from the visible to the far infrared.

According to some embodiments, the combination of a piezo actuator and a tunable lens is one way to achieve wideband tunability and other ways may be employed as known to one skilled in the art. Alternative ways to achieve the wideband tunability without the use of the tunable lens is to replace piezo actuator (141) by stacked piezo actuators. Some of these stacked piezo actuators actuate up to 200 μm. Another alternative is to replace the piezo actuator with a DC linear motor.

The main advantage of the MWSAD is that it can perform both IR and visible spectroscopy. No spectroscopic device can perform both Raman and IR spectroscopy, which are complementary spectroscopic techniques.

In the combined spectroscopy for IR and Raman, the beams from the laser beam and infrared beam go through two different interactions within the sample's material (either at 119 or 127). The laser beam component undergoes elastic and inelastic scattering. The elastic scattering corresponds to Rayleigh scattering and the inelastic scattering corresponds to Raman scattering. The Raman scattering is due to interactions of the laser beam with phonons, molecules vibrations, and rotations. These result in a scattered beam that is up and down frequency shifted. The other wideband IR radiation is absorbed by the sample molecular vibrations and its rotations. Therefore, the reflected or transmitted infrared radiation out of the sample is attenuated accordingly. The output beam from the spectroscopic probe scheme (SPS)(105) is collected and spectrally analyzed by the MWSAD (101).

For colorimetry and UV-Vis spectroscopy, a wideband source from the auxiliary source (111) is used, and the output from the probe systems is analyzed in a similar manner to the previous cases.

For fluorescent spectroscopy, the auxiliary (111) source can be a UV light source, and the samples should be injected by fluorophore (as in PALM) or immunolabeling (as in STORM).

Figure 1B:
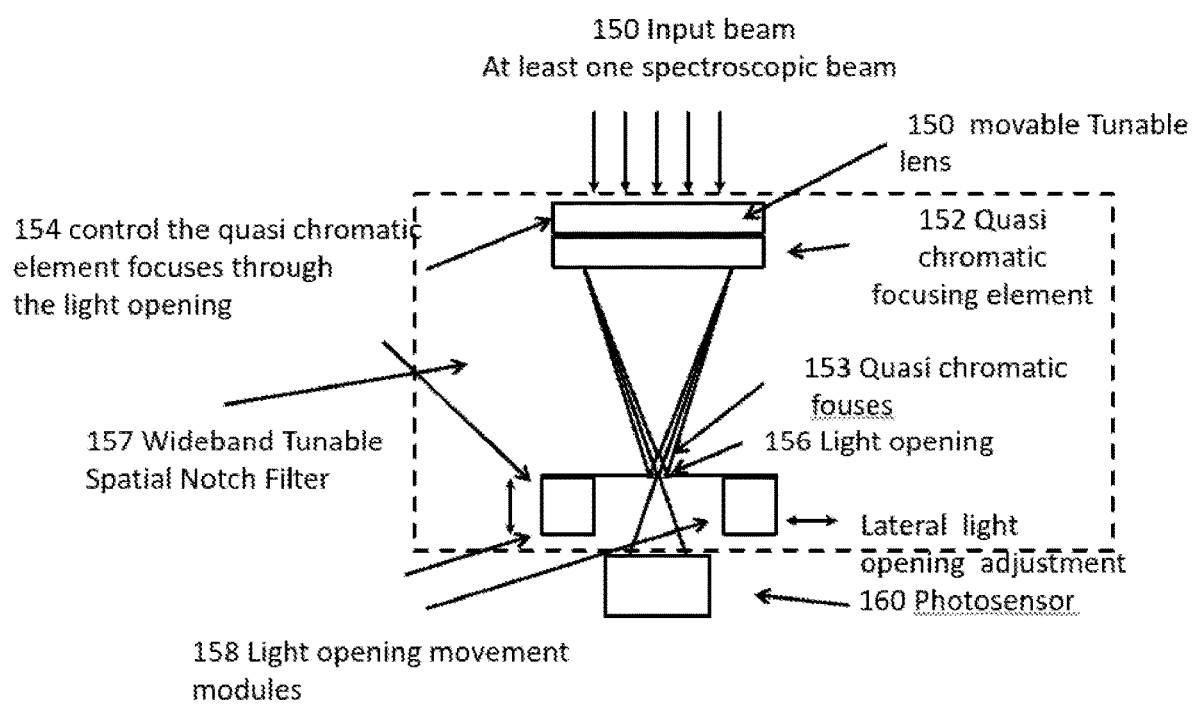
FIG. 1B: Schematic description of another MWSAD spectrometer, according to some embodiments.

In an embodiment, FIG. 1B shows another spectroscopic system based on the MWSAD for multi-purpose spectroscopic applications. The MWSAD in this implementation can be divided into two parts, the Wideband Tunable Notch Spatial Filter 157 and the photosensor 160. In this implementation, a quasi chromatic focusing element 152 receives one or more input beams 150. The quasi chromatic focusing element 152 may focus the light from the input beams 150 to discrete or continuous or combination of chromatic quasi-chromatic focal point 153 and then forward the and forward the focused (or emitted) light through the light opening 156 and to a photosensor 160. The control of the quasi-chromatic focusing element through the light opening 154, can be either a movable or tunable lens 150 or the movement modules 158. The movement module can be configured to move laterally to align the chromatic focuses to be located on the light opening. One can adjust the location of the light opening 156 at specific quasi-chromatic focal point 153 and thus allow the specific wavelength of the input beam to pass toward the photosensor. The movement modules 158 may include any type of actuator or motor as described herein.

All of the components within the dashed box excluding the photo sensor (i.e. the quasi-chromatic focusing element 152, light opening 156, the light opening movement modules and the 154 control the quasi-chromatic focusing element through the light opening and movable or tunable lens 150) can be considered as a Tunable Spatial Notch Filter. The spatial filtering feature of this tunable notch stem from the fact that the light opening 156 is located at the chromatic focal plane 153. At the focal plane of the lens there is present spatial Fourier transform of the input information. Thus, if the light opening is slit (for cylindrical optics) or pinhole (spherical optics) the light opening is acting as a low band-pass spatial filter. Thus, this filter, in addition to selecting a specific wavelength also filters spatial scattering noise and fullerenes noise. The tunable spatial notch filter in the box 157 of FIG. 1B can be used in conjunction with any subsequent spectroscopic system which will be illustrated in two stages spectroscopy of the MWSAD.

The system in this invention can be modified in several ways without changing the main operating mechanism. The OSS described here is suitable for lab application. The Optical Sources Subsystem (OSS) can be modified in more than one way to fit with hand held devices. The laser sources can be replaced by pigtail lasers (pigtail lasers are diode lasers that are coupled into optical fiber) or other laser sources coupled into optical fibers using objective lenses or other optical mechanisms. The auxiliary optical sources and the infrared sources similarly can be coupled to the appropriate fiber. Today, there are fibers that are suitable to operate in different spectral bands that include UV, Visible, near optical IR and Far infrared. The beam splitter can be replaced by fiber couplers and the beam expanders can be replaced by fiber collimators. Also, there is a cuvette holder with an input that is focused on the sample from a fiber and output that is coupled to other fiber. The output from the fiber can be collimated using fiber collimator before entering into the Micro Wideband Spectroscopic Device and before being used in the other sample. The Notch Filter can be integrated directly into the detector. Today, there are photodiodes that are sold with an integrated interference filter.

Performance Parameters for the MWSAD

Several factors control the MWSAD performance. The diffractive focusing element determines the MWSAD's resolution and resolving power. The optical components materials, selected detector, and tunable lens materials and windows determine the bandwidth. The detector limits the MWSAD's sensitivity.

Diffractive Focusing Elements

The diffractive focusing elements are crucial components for determining the spectrometer's resolution and operating band. Several diffractive focusing elements can be considered for the MWSAD implementation. These include but are not limited to Fresnel lens, Fresnel Zone Plate, Photon Sieve and Pinhole Sieve.

Fresnel lens and Fresnel Zone Plate

Figure 2:
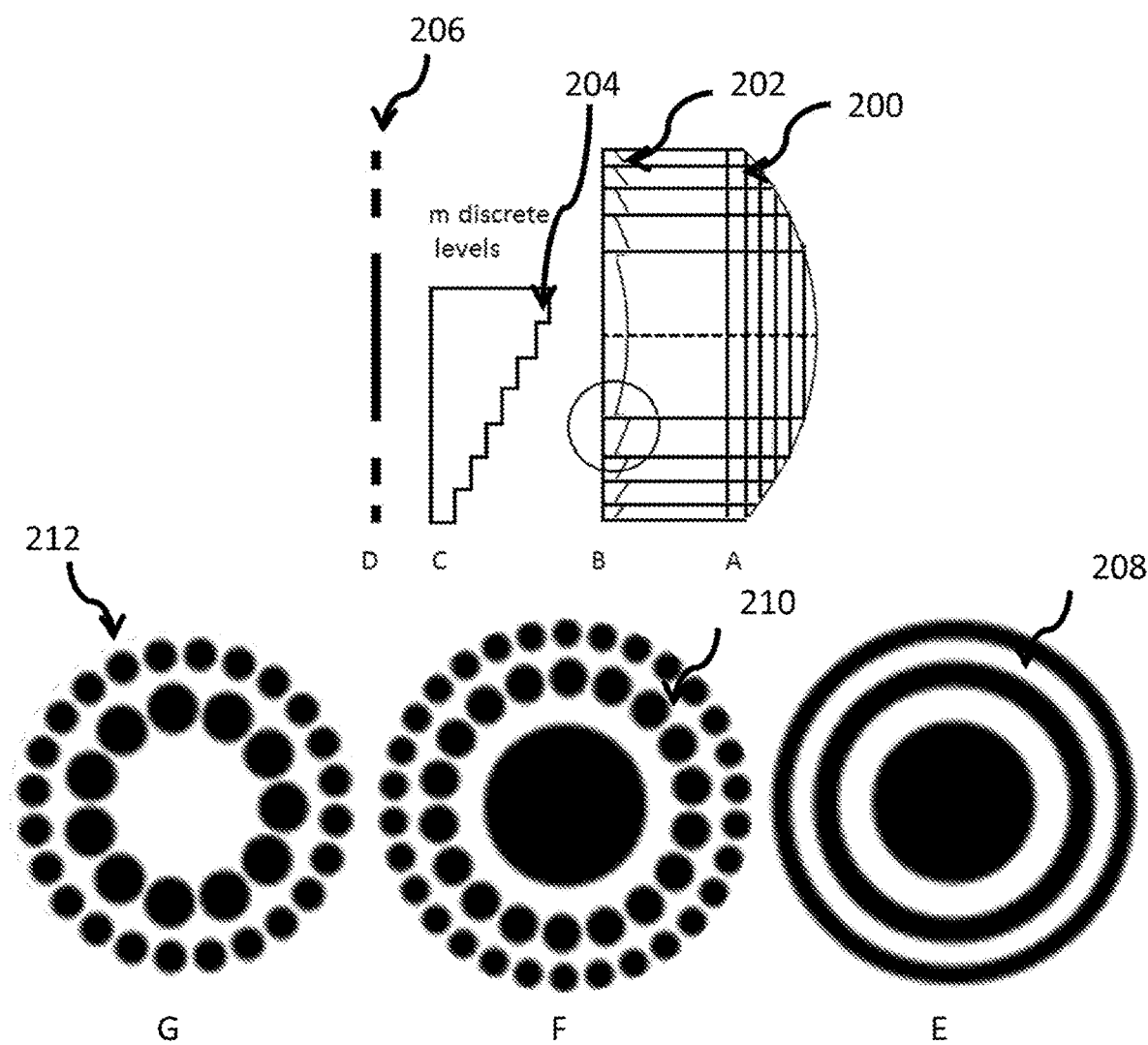
FIG. 2: Description of Fresnel lens and its associate diffractive optical elements derived from curved lenses such as spherical, parabolic . . . . (A) The original curved lens (B) the equivalent Fresnel lens (C) Discrete prism replacing the original contentious (D) Fresnel Zone plate (E) Fresnel Zone in 2D display (F) Pinhole Sieve (G) Photon Sieve.

FIG. 2 shows the Fresnel lens is a diffractive element that may include concentric rings of prisms (202). These prisms are generated by dividing the lens (200) into concentric prism rings followed by adjusting their heights by an integer number of the used wavelength. In micro-fabrication, the prisms are divided into several discrete levels (204).

For MWSAD to operate over the wideband spectrum, it is essential to select a wideband material for fabricating the Fresnel Zone Plate's optical components.

Resolving Power

To achieve Raman spectroscopy with high resolving power, the Fresnel lens should have the following features: a high resolution, a short focal length, and short depth of focus.

According to technology standards), "typical gratings used for Raman vary from perhaps 300 gr/mm (low resolution) to 1800 gr/mm (high resolution) with more specialized gratings (including 2400 gr/mm and 3600 gr/mm). These high-density grooves correspond to groove widths ranging between 0.27 μm-3.3 μm."

(1) "What factors affect spectral resolution in a Raman spectrometer," Horiba Scientific.

To achieve similar results with a Raman spectrometer based on a Fresnel Zone plate, the ranges of the outer zone width should be similar to the grating's grooves' width used in commercial Raman spectrometers. (i.e., 0.27 μm-3.3 μm).

The resolving power of a grating spectroscopy depends on the diffraction order n, and the total number of grooves N that illuminated by the light source.

$$R = \frac{\lambda}{\Delta\lambda} = nN = \frac{nL}{\delta_G} \quad (1)$$

Where L is the grating length and $\delta_G$ is the grating groove dimension.

Fresnel means such as Fresnel Zone Plate is a diffractive element has multi focal point located at ($f_1/3$, $f_1/5$, $f_1/7$, etc.) Where $f_1$ is the focal length of the first order diffraction.

Similarly to equation 1, the Fresnel means spectrometer resolving power for the $l^{th}$ focus is:

$$R_l = \frac{\lambda}{\Delta\lambda} = \frac{lD}{4\delta_F} \quad (2)$$

Where D is the Fresnel lens diameter and $\delta_F$ is the width of the last opaque rings on the Zone plate and l is the diffraction order which corresponds the $l^{th}$ focal point And spectral resolution is:

$$\Delta\lambda_l = \frac{4\delta_F\lambda}{lD} \quad (3)$$

It is evident from equation 1 and 2 that for a Fresnel plate with dimensions equivalent to that of a grating with a width of last opaque rings equivalent to the grating grooves; both should provide similar resolution powers. For example, the spectral resolution (full width at half maximum (FWHM) at λ=500 nm with zone plane with a diameter of D=10 mm and last opaque rings $\delta_F$=0.27 μm is 54 nm and for the third order is 18 nm.

Further improvement in the resolving power can be achieved by using orthogonal linear zone plate, or spiral zone plate instead of circular zone plate.

Currently, Fresnel Zone plates with grooves in these ranges are used in X-ray optics and are available commercially. These Fresnel Zone plates should be fabricated using wideband transparent substrates in order to make them suitable for wideband spectrometry.

Photon Sieve and Pinhole Sieve

A Photon Sieve (210) and Pinhole Sieve (212) are devices for focusing light using diffraction and interference. The Sieves contains a flat sheet of material full of pinholes that are arranged in a configuration which is similar to the rings in a Fresnel zone plate (208), but the Sieves concentrate the light into much sharper focus than zone plates. It is already demonstrated that the Sieves focus light to spot size fifth to what is achieved with Fresnel Zone. Therefore, using Photon Sieves instead of Fresnel Zone plate should increase the resolving power by the square of five times, that is, by 25 times, compared to that of the Fresnel Zone plate.

The selection of Photon Sieve provides the flexibility in selecting pinhole at the focal point of the focusing diffractive element that is suitable for both IR and UV-Vis applications. From one hand provides high resolution for IR applications, and still provides resolution as good as Fresnel zone plate for UV-Vis applications. Furthermore, the sieves can be fabricated by drilling holes in a sheet of metal or other suitable opaque materials, avoiding the materials selection complication for Fresnel zone plate.

The Sieves have been designed in various forms, and some may be more suitable for MWSAD applications.

Wideband Materials for Fresnel Lens and Diffractive Focusing Element

There are few organic and inorganic materials that can be used for the wideband operation. The most commonly used inorganic material for operating in the infrared is Zinc Selenide (ZnSe). ZnSe transmittance ranges between 0.45 µm and 21.5 µm. Other inorganic materials that can extend the device-operating band to UV are Barium Fluoride (BaF$_2$) (0.18-14 µm) and Calcium Fluoride (CaF$_2$) (0.18-11.5 µm). These materials do not have a wideband in the infrared like Zinc Selenide, but have a wider band in the UV. Other materials that can increase the operating band in both the UV and the infrared are Potassium Chloride (0.21-20 µm) and Sodium Chloride (NaCl) 0.25-16 µm. Unfortunately, these materials are not very stable against humidity. If one needs to extend the operating band from the UV to close to THz, one might use Cesium Iodide (CsI) (0.25-55 µm) and diamond (0.225-THz). The diamond has minor absorption bands resulting from two phonon absorptions (between 2.5 and 6.5 µm) (Characteristics of these wideband materials are available in the catalogs of several companies such as janostech.com, valleydesign.com, 2spi.com, newport.com, edmundoptics.com, internationalcrystal.net, and knightoptical.com.)

The organic materials that can be used for the same purpose include but are not limited to Polyethylene, Polyvinylidene fluoride (pvdf) and PMMA. The problem with these materials is that they have few absorption windows and their transmittance is not as flat as the inorganic materials.

Sensitivity and Bandwidth

Photodetector sensitivity determines the spectrometer sensitivity. In addition to the optical components, the selected photodetectors determine the bandwidth.

Today, high-sensitivity hybrid pyro detectors with integrated operational amplifiers and a detection range from 0.1 to 1000 µm are available commercially. Other alternative infrared detectors include thermopile detectors, which are made from bismuth-antimony (BiSb) with an operating band of up to 300 µm; the cooled version of the PbS detector, with an operating band of 150 nm-2.6µ; the PbSe detector with an operating band of 150 nm-4.6µ; and InGaAs, with an operating band between 0.9-1.6µ. Photodetectors with integrated amplifiers are available for operating in the UV, visible, or near-IR spectrums; all can be thermoelectrically-cooled, and many of these photodetectors can be found in avalanche or photon counting detector designs.

Micro Wideband Spectral Analysis Device (MWSAD)

Figure 3:
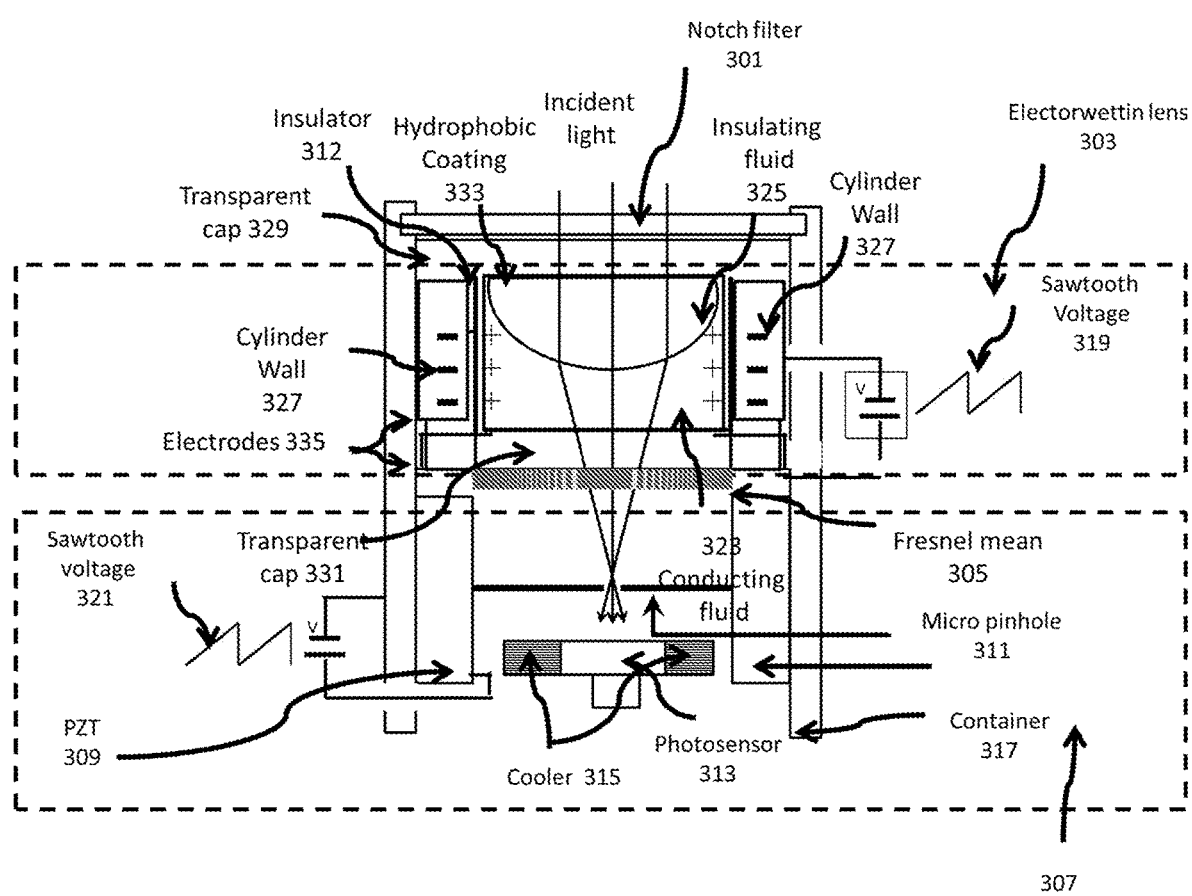
FIG. 3: Schematic diagram illustrates a micro wideband spectral analysis device integrated from a piezoelectric actuator, tunable lens, photo sensor and micro cooler.

FIG. 3 shows a preferred embodiment of the Micro Wideband Spectral Analysis Device (MWSAD), which is compromised of the upper part of an optional Notch Filter (301), tunable lens (in this illustration is electrowetting lens)[24,25] (303), being integrated or combined with a Fresnel means (305). In the lower part (307) of the device, cylindrical PZT (309) controls micro pinhole (311) centralized with a photo detector (313). For far infrared detection, the photodetector is cooled by a micro cooler such as the peltier-thermoelectric-cooler (315) (Today there are commercial products that integrate the photodetector with an amplifier and cooler in one package). The cooler can be in the form of a ring around the sensor or a plate under the detector. Both the upper and the lower parts are encapsulated within an enclosure (317). Both the upper part and the lower part are controlled with a sawtooth control driver. The upper part is driven by (319) and the lower part is driven by (321). For better resolution the Fresnel means (305) can be replaced by Photon Sieve.

The MWSAD is also operating as a low pass filter and filters the high frequency spatial noise such as Rayleigh scattering. This functionality is not available with any MWSAD such as a grating, an interferometer or a Fabry-Pérot cavity. Thus, this feature makes the use of a Notch Filter for the MWSAD optional.

Wideband Tunable Lenses

Two kinds of wide band tunable lenses are illustrated for use with MWSAD. The first is based on electrowetting technology and the second is based on liquid crystal technology.

Wideband Electrowetting Lens

There are several kinds of tunable lenses that may replace the electrowetting lens. Most of these tunable lenses have a very limited operating band and are not suitable for application of wideband band spectroscopy considered in this invention, but may be used for limited band applications. Some of the tunable lenses may be combined/integrated with Fresnel lens and others are available as one piece of a tunable diffractive element. These lenses include but are not limited to: Fresnel lens based on a dielectric elastomer actuator[26], Tunable Lenses made From Graphene[27], Tunable-focus liquid crystal Fresnel zone[28], Optofluidic tunable Fresnel lens[29], stretchable binary Fresnel lens[30], and tunable liquid crystal[31]. Some of the liquid crystal materials have operating band between the UV and the far infrared.

The MWSAD might have several embodiments depending if one use diffractive element, or tunable focus diffractive element, or integrated diffractive element with a tunable lens. All of these optical components can be defined as quasi-monochromatic (or quasi chromatic) focusing elements.

The electrowetting lens (303) may include two non-mixing liquids with different indices of refraction. One of the liquids is conductive (323) and the other is insulating (325). Both of the liquids are contained in a short cylinder (327). The cylinder caps (229 and 331) are made of a wideband transparent material, and the internal side walls are coated with a water-repellent material (hydrophobic) (333). Due to the difference in surface tension of the aqueous solution, the solution takes a hemispherical shape and acts as a spherical lens.

The shape of the lens can be altered by applying an electrical field (319) on the sidewall of the cylindrical tube (327) and the electrode (335). The electrical field induces (319) a change in the surface tension and consequently wets the sidewalls of the tube which changes the curvature between the two aqueous solutions. Subsequently, this tunes the focal length of the lens through applying the electrical field. The lens can be tuned from being convex to flat and concave.

For the wideband operation of this spectrometer, it is extremely important to select the appropriate electrowetting liquid and the appropriate windows for the electrowetting lens. For the windows, it is essential to select one of the materials suggested above for the Fresnel zone plate. The windows should be coated with a material that gives a good surface tension for the liquid within the lens. The water should be replaced by other conductive liquid that is repellent to the silicon oil.

CYTOP Amorphous fluoropolymer is the best choice for the windows coating. CYTOP Amorphous fluoropolymers[32] have an-excellent flat transparency in the range of 250 nm-3 µm which covers UV-Vis 300-nm780 nm, near IR (0.75-1.4 µm) and short-wavelength infrared SWIR (1.4-3 µm). The CYTOP'S also have a good fluctuating transparency for most of the mid-wavelength infrared (MWIR 3-8 µm). The CYTOP transmitting band at the SWIR is between 3 µm-7 µm. At the Long-wavelength infrared (LWIR the range of 8-15 µm), the CYTOP has three narrow transparent bands around 10 µm, 13 µm and 15 µm. At the far infrared FIR (15-1000 µm), CYTOP again becomes transparent from 22 µm up to THZ frequencies.

Current off-shelf electrowetting lens provides operating band between the UV and the Near IR (300-1600 nm) or UV-Short-wavelength infrared (200 nm-2200 nm). This limits the operating bands for MWSAD to the same operating band of the electrowetting lenses. For wider operating band, some of the liquids within the electrowetting lenses have to be replaced.

For a more extended operating band of the MWSAD, the electrowetting lens (303) in FIG. 3 can be replaced by a special material design of liquid crystal operating between the UV and LWIR. Design of this lens is described below.

Wideband Tunable Liquid Crystal Lens

Figure 4:
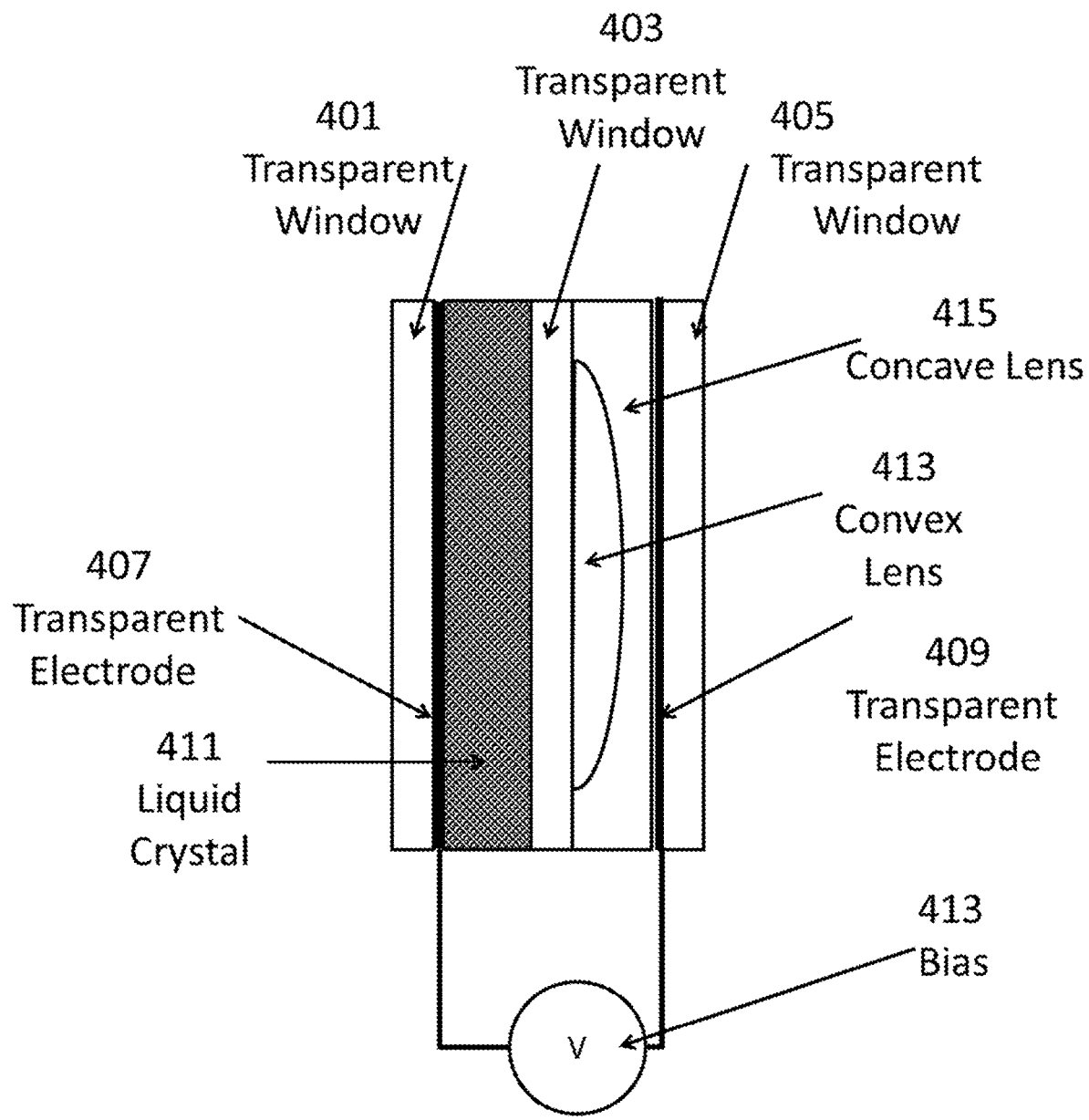
FIG. 4: Liquid crystal tunable lens.

The electrowetting lens can be replaced by a liquid crystal tunable lens. There are few designs of a liquid crystal tunable lens, however, our preferred one is the one shown in FIG. 4, which may include transparent windows (401, 403, 405), transparent conductive electrodes (TCE) (407, 409), convex lens (413), concave lens (415), and liquid crystal (411).

In this design, when a bias is applied to the two electrodes (407, 409), different parts of the liquid crystals experience different biases according to the curvature of the convex (413) and concave (415) lenses. As such, some embodiments make liquid crystal molecules change orientation according to the lenses (413) and (415), and that changes the optical path length through the liquid crystal.

For operating in the wideband, all the materials for the windows and the lenses can be selected from any combination of wideband transparent materials mentioned previously. Transparent conductive electrode (TCE) can be selected from wideband transparent materials.

The most commonly used TCEs are doped metal oxide-coated glasses, e.g., tin doped indium oxide (ITO) (refer to the ITO-coated substrates on page 13), fluorine-doped tin oxide (FTO), and aluminum zinc oxide (AZO). But, for wide operating band, it's preferred to select ZnO[33-35], Doped diamond[36-37], carbon nanotubes[38], graphene and graphene oxide[38-42]. These materials are transparent from the UV to the entire visible region through the far infrared.

MEMS Micro Pinhole Actuators

Figure 5:
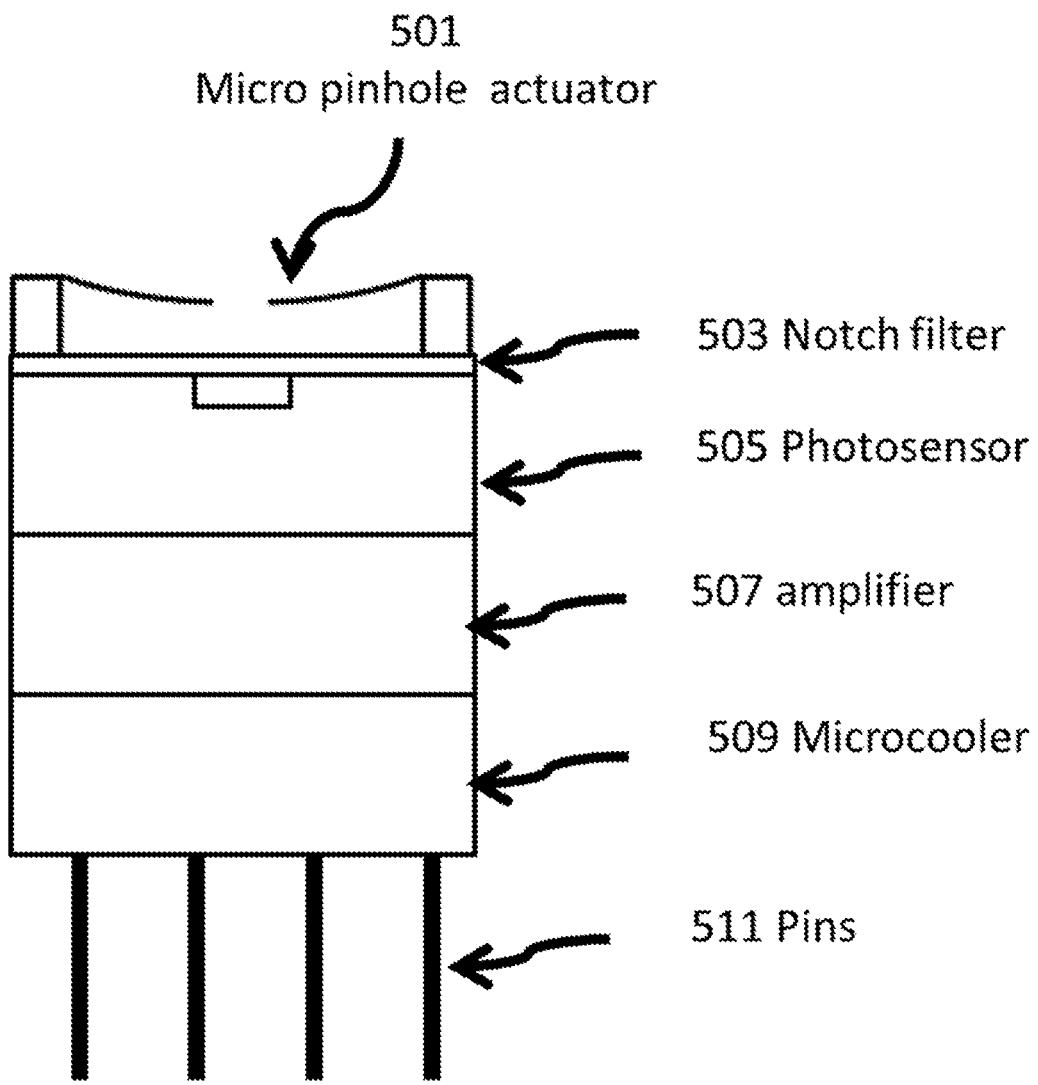
FIG. 5: Schematic diagram illustrated a lower part replacement of the micro wideband spectral analysis device MWSAD in FIG. 3 (Component 307). This replacement includes micro pinhole actuator, optional notch filter, photosensor amplifier and micro cooler.

The device can be integrated more compactly by replacing the PZT (309), which controls micro pinhole of FIG. 3 by a micro pinhole actuator integrated on the detectors shown in FIG. 5. The micro pinhole actuator (501), the photosensor (505), the amplifier (507), and the micro cooler (509) may be other electronic components that can be integrated into one unit. FIG. 5 shows a micro pinhole actuator integrated on an integrated detector, amplifier, and cooler. Micro Electro Mechanical Systems (MEMS) actuator integrated with a photodetector in Fabry-Pérot arrangement functions as a stand-alone spectrometer.

MWSAD with a Long Stroke Actuator

According to some embodiments, the combination of piezo actuator and tunable lens is one way to achieve fine and wideband tunability, and other such way may be employed herein as known to one skilled in the art. An alternative way to achieve the fine and wideband tunability is simply by combing the fine tuning actuator with a long stroke actuator such as a stacked piezo actuator or DC linear motor. The DC linear motor can, for example, be a linear voice coil motor. Some of the piezo stacks offer tunability of more than 200 µm while the DC linear motors can offer tunability in mm up to centimeters. If the long stroke actuator has fine tunability, then there is no need for a fine tunability device. These approaches might be bulkier and do not require the use of the tunable lens. The advantage of this approach is that it can overcome any potential limitation that is associated with electrowetting lenses or other tunable lenses such as the optical transmission window, tuning range, and undesired aberrations.

Figure 6:
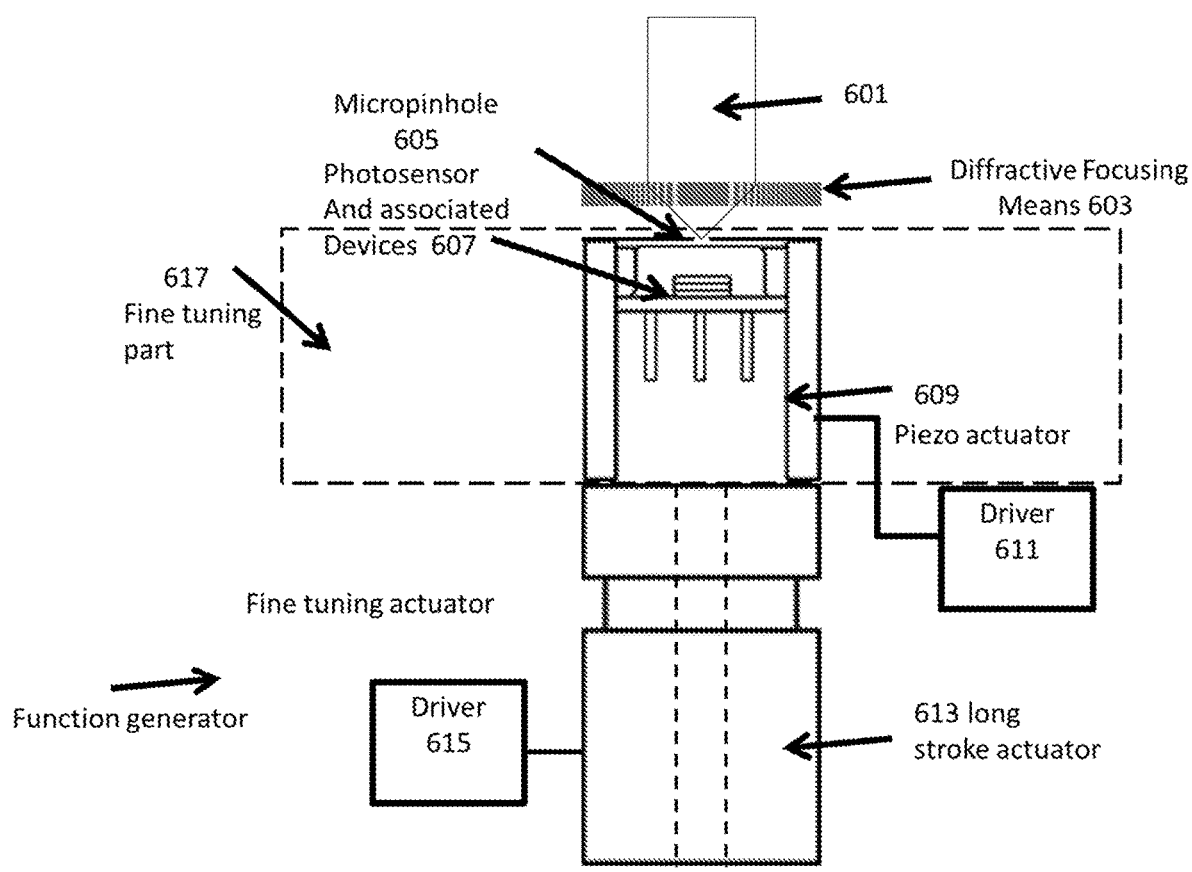
FIG. 6: Schematic diagram illustrates the micro wideband spectral analysis device MWSAD based on combining piezo actuator with a long stroke actuator According to some embodiments.

FIG. 6 shows the MWSAD design based on a fine and wide-range (long stroke) tuning actuator. The spectroscopic data in the beam (601) passes through focusing diffractive element means (603) and focuses through the micro pinhole (605) on the photo sensor (607) which includes all its associated components. The piezo actuator (609) control the micro pinhole (605) positions for fine tuning and the long stroke actuator (613) control the micro pinhole for a wide range tuning. The fine tuning part (617), which may include the piezo actuator (609), the micro pinhole (605), and a photosensor (607) can be replaced as described in FIG. 5 by micro pinhole MEMS integrated on the photo sensor. The fine tuning piezo actuator is driven by the driver (611) and the long stroke actuator is driven by a driver (615).

In this invention, according to FIG. 3, it was considered an implementation of MWSAD based on combining a tunable lens for wideband tuning and piezo control pinhole for finite tuning. In FIG. 5 it was considered replacing the PZT controlled pinhole and photodetector by a pinhole actuator with an integrated photosensor. In FIG. 6, it was considered to achieve the wideband tuning by replacing the tunable lens with a long stroke linear motor.

The tunable lens offers focal point tunability over a wide range, but its optical band is governed by the lens optical transmission. The PZT can have a stroke of few microns and may be up to 100 µm for a cascade of several PZTs. The linear motor can have a stroke that reaches up to a few centimeters. The MEMS pinhole actuators have extremely limited actuation and therefore are suitable for fine tunability. All of these devices have different capabilities. Thus, it possible with this invention to utilize the features of these devices and to improve the capability of the MWSAD described in FIG. 1. One can design MWSAD with an extreme fine and very wide tunability.

MWSAD with a Long Stroke Actuator and Tunable Lens

Figure 7:
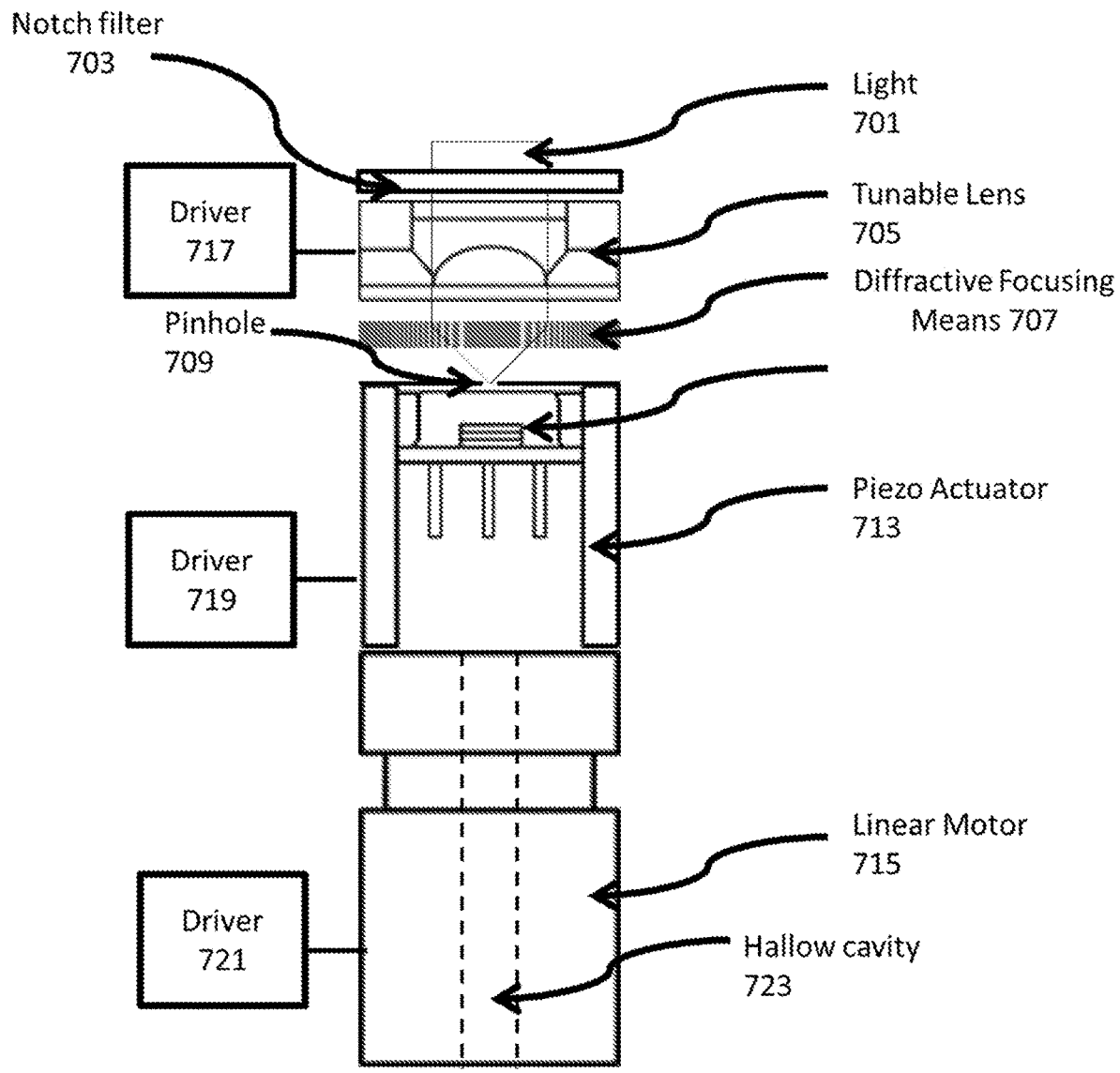
FIG. 7: Schematic diagram illustrates the micro wideband spectral analysis device MWSAD based on combining piezo actuator, long stroke actuator and a tunable lens.

One possible implementation is to include: an optional Notch Filter (703), a tunable lens (705), a Diffractive Focusing Element (707), a piezo controlled pinhole (709), a piezo actuator (713), and a linear motor (713) as shown in FIG. 7. FIG. 7 shows an assembly of the MWSAD which may include: an optional Notch Filter (703), a tunable lens (705), a diffractive focusing means (707), a pinhole (709), and a piezo actuator (713) that is centralized by a photo sensor (711) and a linear motor (715).

The photosensor as described previously may include an integrated amplifier and a micro cooler. Each of the components has a driver: the tunable lens driver (717), the PZT actuator driver (719), and the linear motor driver (721). The driver wiring can be arranged to inter from the hallow cavity of the hallow cavity (723).

MWSAD with a Dual Functionality of MEMS Pinhole Actuator

An improved implementation of the MWSAD described in FIG. 7 is achieved by replacing the photosensor (709) with an integrated actuating pinhole MEMS with a wideband photosensor as described in FIG. 5. The improved implementation of FIG. 7 is shown in FIG. 8.

Figure 8:
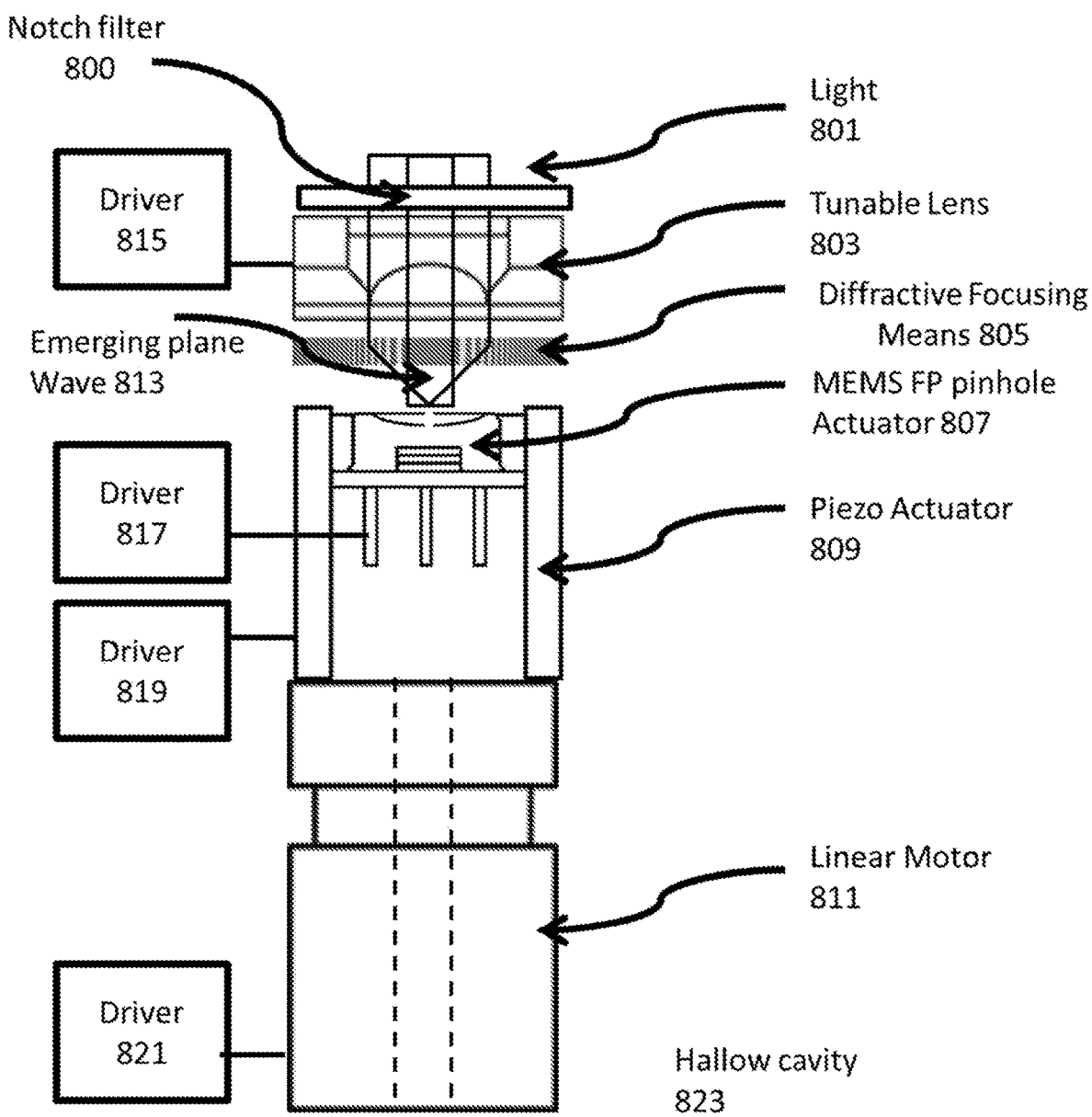
FIG. 8: Schematic diagram illustrates the micro wideband spectral analysis device MWSAD based on combining piezo actuator, long stroke actuator, a tunable lens, and MEMS FP Pinhole actuator.

According to this modification, the MWSAD implementation (the device as shown in FIG. 8) may include the following components: an optional Notch Filter (800), a tunable lens (803), a Diffractive focusing means (805), MEMS pinhole actuator (807), a piezo actuator (809), and a linear motor (811). The MEMS pinhole actuator (807) can be upgraded to function as both a pinhole actuator and a MEMS Fabry-Pérot cavity. MEMS Fabry-Pérots are already used as a micro spectrometer. In this case, the component (807) has two functionalities; as a micro pinhole actuator, and as a micro spectrometer Fabry-Pérot spectrometers with a high finesse factor offer Resolving Power in the order of $10^6$. This resolving power is two orders of magnitude higher than is achieved by a grating based spectral analysis devices.

The MEMS FP pinhole actuator (807) can be utilized in two ways; (A) using the actuating pinhole feature of the device for extreme finite tuning as it has been considered in FIG. 5 (B) using it as a micro Fabry-Pérot interferometer (micro spectrometer) for an additional spectral analysis with very high resolving power. In order to be used it as a micro interferometer, the tunable lens should be tuned to the position where the emerging wavefront (813) from the diffractive focusing mean at a specific wavelength is partially a plane wave.

This implementation has two drawbacks; the first is that the plane wave output from the diffractive focusing element, in case of a zone plate, represents 40% of the total energy that is transmitted through the diffractive focusing mean. The rest of the emerging light from the zone plate is a noise. Further, this implementation has no pre-fluorescence noise filtering except at the Fabry-Pérot cavity. To overcome these drawbacks, there is alternative implementation which may include two stages of spectral analysis. The first spectral analysis is based on the MWSAD described in FIG. 3, followed by further spectral analysis based on micro Fabry-Pérot interferometer.

Each of the components has a driver: the tunable lens driver (815), the MEMS FP pinhole actuator driver (817), the PZT actuator driver (819), the linear motor driver (821). The driver wiring can be arranged to inter from the hallow cavity of the hallow cavity. Some of the driver wirings can be inserted into the hollow cavity of the linear motor (823).

High Resolving Power Wideband Spectroscopic Analysis Devices

Figure 9:
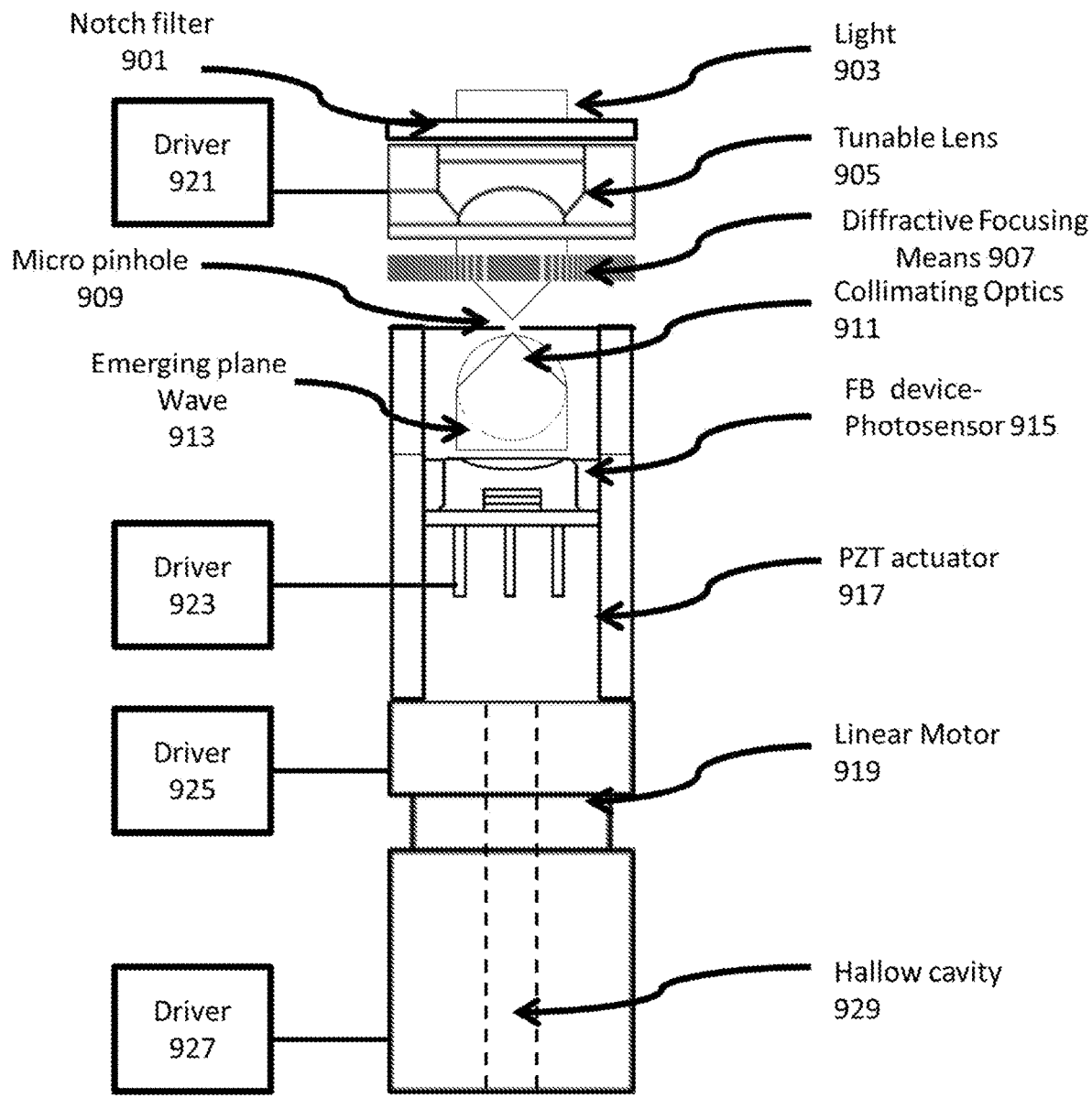
FIG. 9: Schematic diagram illustrates the micro wideband spectral analysis device MWSAD based on combining piezo actuator, long stroke actuator, a tunable lens, and a FP Pinhole device.

The MEMS FP pinhole actuator (807) in FIG. 8 can be utilized either as a micro pinhole actuator or as a micro spectrometer, but not both. In FIG. 9 is shown an alternative design to overcome this problem.

The setup of FIG. 9 may include the following components: a Notch Filter (901), a tunable lens (905), a Fresnel zone means (907), a micro pinhole (909), collimating optics (911), a FP device integrated photosensor (915), a PZT actuator (917), and a linear motor (917). The FP device can be either MEMS FP photosensor integrated, or an alternative tunable liquid crystal FP integrated or combined with a photosensor.

The device operates similarly to the setup of FIG. 6 with additional advantages to both the setups of FIG. 7 and FIG. 8. The collimating optics (911) collimates the point source of light emerging from the micro pinhole and enters to the FP-Photosensor device (913) as a plane wave (913). In contrast to the implementation in FIG. 7 where the light entering FP cavity is very noisy, the light that enters the (913) component is filtered out. The light is filtered out from high order diffraction orders of the diffractive focusing means as well as from other fluorescence noise which is very common in Raman spectroscopy.

In this implementation, the light passed through three filtering stages. First, it passed through Notch Filter (901), second, through the micro pinhole (909), and third, at the Fabry-Perot cavity of (913). The Fabry-Pérot can be designed with resolving power in the order of $10^6$. The first stage of spectral analysis can be designed with resolving power which reaches up $10^5$. The Notch Filter can provide resolving power of up to $10^6$. The combination of all these should offer Resolving Power in the order of $10^{17}$.

Without the Notch filter, resolving power in the order of $10^{11}$ can be achieved. This resolving power is sufficient for achieving Raman spectroscopy in many complicated environments.

Each of the components has a driver: the tunable lens driver (921), the FP driver (923), the PZT actuator (925), and the linear motor driver (927). The driver wiring can be arranged to inter from the hallow cavity of the linear motor.

In all of the FIGS. 3 through 9) one might include x-y nano positioning devices for adjusting the pinhole location.

The MWSAD can use spherical or cylindrical optical components, for spherical optical components a slit should be used instead of a pinhole. Either slits or pinhole can be considered as light opening.

APPENDIX

The Fresnel lens performance parameters are related and depend on the used wavelength, the number of concentric rings and the discrete level binarization through this relationship[1, 32]

$$r(n, m) = \left[\left(\frac{n\lambda}{n_0 2^m}\right)^2 + 2f\left(\frac{n\lambda}{n_0 2^m}\right)\right]^{1/2} \quad (1)$$

Where $\lambda$ is the wavelength, $n_0$ is the index of refraction, $r(n,m)$ is the width of the rings, m is the number of discrete levels in the lens fabrication.

If the Fresnel lens is amplitude binarized (two discrete levels 0 and 1), then, the lens becomes a circular grating with a symmetric array of annular ring zones. These zones are alternately transparent and opaque. The Fresnel lens with two binary levels is the Fresnel zone plat; by substituting m=2 and $n_0$=1 (the air index of refraction), Equation 1 for Fresnel zone can be simplified to:

Notice here that f is replaced by l.f where l represents the focal point order. In contrast to a regular lens which has preferably one focus, the Fresnel zone plate is a grating that has many focuses. These focuses are the diffraction orders of the grating. As any other grating, the diffraction orders have discrete location as a function of the wavelengths.

$$r_n^2 = n\lambda l f + n^2 \frac{\lambda^2}{4}, n = 1, 2, 3, \ldots, n, \quad (2)$$

Notice in equation 2 that f is replaced by l.f where l represents the focal point order. The zone plane has several diffraction orders which represent the focal point orders For short wavelengths, the equation can be modified to $$r_n^2 = n\lambda l f, \, n=1,2,3, \ldots n \quad (3)$$

Equation 3 is explained as the conditions in which waves from the transparent zones arrive at the focal point $$r_n^2 - r_{n-1}^2 = \lambda l f \approx \delta D \quad (4)$$

Where $\delta$ is the width last opaque ring on the Fresnel zone plate

Thus $l^{th}$ focal length of the zone plate is:

$$f = \frac{D\delta}{\lambda l} \quad (5)$$

The depth of focus (DOF) for a lens is $$DOF = 2.441 \lambda (f/D)^2 \qquad (6)$$

Were D is the lens diameter.

Substituting equation 5 into equation 6 yields the zone plate's $l^{th}$ focal point depth of focus $$DOF_1 = 2.441 \lambda \left(\frac{f}{D}\right)^2 = 2.441 \frac{\delta^2}{\lambda l^2} \qquad (7)$$

The Fresnel Zone Plate's resolution (spot size) of the $l^{th}$ order can be derived from Rayleigh criterion of standard lens' resolution combined with equation 5.

$$SZ_l = 1.27 \frac{\lambda f}{D} = 1.27 \frac{\delta}{l} \qquad (8)$$

This means that the zone plate resolution improves inversely with the order number l.

The disadvantage of using high order diffraction is that the efficiency of the zone plate decreases as the square of the order number increases.

The efficiency of the zone plate is 10% and can be improved up to 40% if the plate is made of two binary phase levels. Zone plates with zone width in the range of 40-70 nm have been fabricated; these plates have been used in x-ray microscopy. Resolution up to 40 nm has already been reported.

The resolving power "R" of the Fresnel zone spectrometer is.

$$R = \frac{\lambda}{\Delta \lambda} = \frac{D}{4F\lambda} \qquad (9)$$

Where F is the F number of the lens defined as:

$$F = \frac{f}{D} \qquad (10)$$

Substituting equation 10 in 9 and using equation 5 yields that the resolving power for the $1^{st}$ focal point is:

$$R_l = \frac{\lambda}{\Delta \lambda} = \frac{D}{4F\lambda} = \frac{D^2}{4\lambda f} = \frac{lD}{4\delta} \qquad (11)$$

This means that the resolving power of the Fresnel is proportional to the ratio of the zone plate diameter with the last zone.

And the resolution at the $1^{st}$ focal point is given by:

$$\Delta \lambda = \frac{4\delta}{lD} \lambda \qquad (13)$$

The resolution improves at shorter wavelength, a high order of focal planes selection, larger Fresnel zone diameter and smaller width of the last opaque zone.

Further embodiments are in accordance with the following numbered statements:

1. The spectroscopic analysis device compromising:
   (a) a spectroscopic probe input beam
   (b) Notch filter for allowing a spectral band to be transmitted
   (c) Light opening for allowing specific quasi chromatic focused light to pass through the light opening
   (d) At least one means for controlling the quasi chromatic focuses element focuses through the light opening
   (d) Photosensor for detecting the light transmitted through the light opening.
   (e) Collimating lens for collimating the quasi chromatic light transmitted through the light opening for second stage of spectral analysis
   (f) Fabry-Perot interferometer device a second stage spectral analysis
2. The quasi chromatic focusing element in claim 1 wherein said selected at least one member of a group comprising: Fresnel Lens, Fresnel Zone Plate, Photon Sieve, Pinhole Sieve, Tunable Diffractive Focusing Element.
3. The chromatic focusing element in claim 2 for wideband operating conditions is wherein said to be laid on wideband materials selected at least one member of a group comprising: Zinc Selenide (ZnSe) (0.45 µm and 21.5 µm), Barium Fluoride (BaF$_2$) (0.18-14 µm) Calcium Fluoride (CaF$_2$) (0.18-11.5 µm) Potassium Chloride (0.21-20 µm), Sodium Chloride (NaCl) 0.25-16 µm, Cesium Iodide (Csl) (0.25-55 µm) and diamond (0.225-THz), Organic materials include but are not limited to Polyethylene, Polyvinylidene fluoride (pvdf) and PMMA.
4. (4) The means for controlling the quasi chromatic focusing element focuses through light opening in claim 1 is wherein said selected at least one member of a group comprising: tunable lens, tunable focus diffractive element, piezo electric actuator, MEMS with light opening membrane, DC linear motor and MEMS light opening photosensor integrated
5. The light opening within claim 1 is designed with a diameter approaching the diffraction limit of the chromatic focusing element for achieving high resolution spectroscopic analysis
6. The photosensor in claim 1 is selected from wideband operating brand material
7. The photosensor in claim 1 for achieving wideband spectral response is wherein said selected at least one member of a group comprising: tunable hybrid pyro detectors (0.1 to 1000 µm), thermopile detectors (300 µm; PbS detector (150 nm-2.60; PbSe detector (150 nm-4.6µ); and InGaAs (0.9-1.6µ).
8. The photosensor in claim 7 for high sensitivity is integrated with an electronic amplifier
9. The photosensor in claim 7 is integrated with cooling device
10. The photosensor in claim 8 is integrated with cooling device
11. The photosensor in claim 7 compromises optical detector, electronic amplifier and cooling device.
12. Wideband Liquid crystal lens in claim 5 compromises
    (a) Wideband transparent windows wherein said selected at least one member of a group comprising, Zinc Selenide (ZnSe) (0.45 µm and 21.5 µm), Barium Fluoride (BaF$_2$) (0.18-14 µm) Calcium Fluoride (CaF$_2$) (0.18-11.5 µm) Potassium Chloride (0.21-20 µm), Sodium Chloride (NaCl) 0.25-16 µm, Cesium Iodide (Csl) (0.25-55 µm) diamond (0.225-THz), Organic materials include but are not limited to Polyethylene, Polyvinylidene fluoride (pvdf) and PMMA.

(b) Conductive electrodes wherein said selected at least one member of a group comprising tin doped indium oxide (ITO), fluorine-doped tin oxide (FTO), aluminum zinc oxide (AZO), aluminum zinc oxide (AZO). ZnO, Doped diamond, carbon nano tubes, graphene and graphene oxide.

(c) Convex lens wherein said selected from group including Zinc Selenide (ZnSe) (0.45 μm and 21.5 μm), Barium Fluoride ($BaF_2$) (0.18-14 μm) Calcium Fluoride ($CaF_2$) (0.18-11.5 μm) Potassium Chloride (0.21-20 μm), Sodium Chloride (NaCl) 0.25-16 μm, Cesium Iodide (Csl) (0.25-55 μm) diamond (0.225-THz), Organic materials include but are not limited to Polyethylene, Polyvinylidene fluoride (pvdf) and PMMA.

(d) liquid crystal wherein said selected at least one member of a group comprising Azobenzene liquid crystals, Azobenzene monomers, Chiral azobenzene dyes, Photoalignment materials, Fast azobenzene liquid crystals with enhanced, e PAAD azobenzene 13. Fabry-Perot interferometer device in claim 1 for a second phase of spectral analysis wherein said to be integrated with the photosensor 14. The MEMS pinhole device in claim 4 wherein said to be integrated with the photosensor 15. The tunable lens in claim 4 is wherein said for wideband tuning 16. The DC linear motor claim 4 is wherein said for wideband tuning 17. The piezo electric actuator in claim 4 is wherein said for fine tuning 18. The MEMS light opening in claim 4 is wherein said for ultrafine tuning 19. The Sieves for a wideband spectroscopy said that the pinholes at the outer side rings is in the order of the longest wavelength used for the spectroscopy.

20. (20) The input beam of claim 1 combines at least one probe beam of a group comprising, probe beam from laser Raman Scattering, probe beam from IR absorption, probe beam of UV-VIS absorption, probe beam from florescence scattering.

21. The light opening in claim 1, wherein said is located on a means for transvers controlling aligning the quasi chromatic light focuses to pass 22. The tunable notch-spatial filter within claim 1 for second stage of spectroscopy compromises
    (a) Light opening for allowing specific quasi chromatic focused light to pass through the light opening
    (b) At least one mean for controlling the quasi chromatic focuses element focuses through the light opening 23. The tunable notch-spatial filter compromises
    (a) Light opening for allowing specific quasi chromatic focused light to pass through the light opening
    (b) At least one mean for controlling the quasi chromatic focuses element focuses through the light opening The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A wideband tunable spectral notch spatial noise filter compromising:
    a quasi chromatic diffractive focusing element configured to receive one or more input beams and configured to analyze the one or more input beams and to transmit at least a portion of light associated with the one or more input beams, the at least a portion of light transmitted comprising spectral-spatial components of the one or more input beams;
    at least one of (i) a tunable lens configured to adjust a focal point location of the quasi chromatic diffractive focusing element through a light opening for simultaneous notch spectral-spatial filtering, and (ii) a tunable diffractive element configured to analyze the one or more input beams to the spectral-spatial components and to adjust a focal point of chromatic focuses of the quasi chromatic diffractive focusing element through the light-opening; and
    a movable or static light opening configured to receive the transmitted at least a portion of light and to transmit a selected spectral-spatial band through the light opening to a sequential optical device or spectral detection analysis device.

2. The wideband tunable spectral notch spatial noise filter of claim 1, wherein the quasi chromatic diffractive focusing element comprises a Fresnel Lens, a Fresnel Zone Plate, a Photon Sieve, a Pinhole Sieve, a stretchable version of a Fresnel lens, a stretchable version of a Fresnel zone plate, a stretchable version of a photon sieve, or a stretchable version of a pinhole sieve.

3. The wideband tunable spectral notch spatial noise filter of claim 1, further comprising at least one further device configured to focus the at least a portion of the light through the movable light opening, the at least one further device including one or more of a piezo electric actuator, a Micro-Electro-Mechanical Systems (MEMS) light opening membrane, a linear motor, and a Micro-Electro-Mechanical Systems (MEMS) light opening photosensor.

4. The wideband tunable spectral notch spatial noise filter of claim 1, wherein the movable or tunable lens includes at least one of wideband transparent windows, wideband transparent conductive electrodes, a wideband transparent convex lens, and a wideband transparent liquid crystal, wideband liquid materials, wideband liquid fluids, a tunable diffractive focusing element, an electrowetting lens, and a liquid crystal lens.

5. The wideband tunable spectral notch spatial noise filter of claim 3, wherein at least one of:
    the DC linear motor is configured to enable wideband tuning of the at least a portion of the transmitted light;
    the piezo electric actuator is configured to enable fine tuning of the at least a portion of the transmitted light; and
    the Micro-Electro-Mechanical Systems (MEMS) light opening photosensor is configured to enable fine tuning of the at least a portion of the transmitted light.

6. A device compromising:
    a quasi chromatic focusing element configured to receive one or more spectroscopic input beams and configured to transmit at least a portion of light associated with the one or more spectroscopic input beams;
    a movable or tunable lens configured to adjust a focal point location of the quasi chromatic focusing element;
    a sequential optical device;
    a movable or static light opening configured to receive the transmitted at least a portion of light and enable the at least a portion of transmitted light to be passed to the sequential optical device; and at least one of: (i) a tunable spatial notch filter configured to enable a spectral band to be transmitted from the at least a portion of the transmitted light; and (ii) a collimating lens configured to collimate the at least a portion of the transmitted light, the collimating lens further configured to forward the collimated at least a portion of the transmitted light to a spectral analyzer, the spectral analyzer being configured to analyze the at least a portion of the transmitted light.

7. A device compromising:

a quasi chromatic focusing element configured to receive one or more spectroscopic input beams and configured to transmit at least a portion of light associated with the one or more spectroscopic input beams;

a movable or tunable lens configured to adjust a focal point location of the quasi chromatic focusing element;

a sequential optical device; and a movable or static light opening configured to receive the transmitted at least a portion of light and enable the at least a portion of transmitted light to be passed to the sequential optical device;

wherein the movable light opening is designed to have a diameter or width approaching the diffraction limit of the quasi chromatic focusing element configured to perform high resolution spectroscopic analysis.

8. A device compromising:

a quasi chromatic focusing element configured to receive one or more spectroscopic input beams and configured to transmit at least a portion of light associated with the one or more spectroscopic input beams;

a movable or tunable lens configured to adjust a focal point location of the quasi chromatic focusing element;

a sequential optical device;

a movable or static light opening configured to receive the transmitted at least a portion of light and enable the at least a portion of transmitted light to be passed to the sequential optical device; and at least one further device configured to focus the at least a portion of the light through the movable light opening, the at least one further device including one or more of a tunable focus diffractive element, a piezo electric actuator, a Micro-Electro-Mechanical Systems (MEMS) light opening membrane, a DC linear motor, and a Micro-Electro-Mechanical Systems (MEMS) light opening photosensor;

and wherein at least one of:

the Micro-Electro-Mechanical Systems (MEMS) light opening photosensor is coupled to a Micro-Electro-Mechanical Systems (MEMS) pinhole device;

the movable or tunable lens is configured to perform wideband tuning of the at least a portion of the transmitted light;

the DC linear motor is configured to enable wideband tuning of the at least a portion of the transmitted light;

the piezo electric actuator is configured to enable fine tuning of the at least a portion of the transmitted light; and the Micro-Electro-Mechanical Systems (MEMS) light opening photosensor is configured to enable fine tuning of the at least a portion of the transmitted light.

9. A device compromising:

a quasi chromatic focusing element configured to receive one or more spectroscopic input beams and configured to transmit at least a portion of light associated with the one or more spectroscopic input beams;

a movable or tunable lens configured to adjust a focal point location of the quasi chromatic focusing element;

a sequential optical device;

a movable or static light opening configured to receive the transmitted at least a portion of light and enable the at least a portion of transmitted light to be passed to the sequential optical device; and at least one of: (i) a tunable spatial notch filter configured to enable a spectral band to be transmitted from the at least a portion of the transmitted light; and (ii) a collimating lens configured to collimate the at least a portion of the transmitted light, the collimating lens further configured to forward the collimated at least a portion of the transmitted light to a spectral analyzer, the spectral analyzer being configured to analyze the at least a portion of the transmitted light;

wherein the notch filter is a tunable notch-spatial filter configured to perform a further stage of spectroscopy.

10. A device compromising:

a sieve optical element including a photon sieve or pinhole sieve, the sieve optical element configured to receive one or more spectroscopic input beams and transmit at least a portion of light associated with the one or more spectroscopic input beams;

a photosensor configured to receive the at least a portion of transmitted light; and a movable light opening configured to enable the photosensor to receive the at least a portion of transmitted light; and a tunable spatial notch filter configured to enable a spectral band to be transmitted from the at least a portion of the transmitted light, wherein the notch filter is a tunable notch-spatial filter configured to perform a further stage of spectroscopy.

11. A device compromising:

a sieve optical element including a photon sieve or pinhole sieve, the sieve optical element configured to receive one or more spectroscopic input beams and transmit at least a portion of light associated with the one or more spectroscopic input beams;

a photosensor configured to receive the at least a portion of transmitted light; and a movable light opening configured to enable the photosensor to receive the at least a portion of transmitted light;

at least one further device configured to focus the at least a portion of the light through the movable light opening, the at least one further device including one or more of a tunable focus diffractive element, a piezo electric actuator, a Micro-Electro-Mechanical Systems (MEMS) light opening membrane, a DC linear motor, a Micro-Electro-Mechanical Systems (MEMS) light opening photosensor, and a movable or tunable lens; and a movable or tunable lens configured to adjust a focal point location of the sieve optical element wherein at least one of:

the Micro-Electro-Mechanical Systems (MEMS) light opening photosensor is coupled to a Micro-Electro-Mechanical Systems (MEMS) pinhole device;

the movable or tunable lens is configured to perform wideband tuning of the at least a portion of the transmitted light;

the DC linear motor is configured to enable wideband tuning of the at least a portion of the transmitted light;

the piezo electric actuator is configured to enable fine tuning of the at least a portion of the transmitted light; and the Micro-Electro-Mechanical Systems (MEMS) light opening photosensor is configured to enable fine tuning of the at least a portion of the transmitted light.

12. A wideband tunable spatial noise filter compromising:
a quasi chromatic focusing element configured to receive one or more spectroscopic probe input beams;
a light opening configured to enable the quasi chromatic focused light to pass through the light opening itself;
a focusing module configured to control focus of the light passed through the light opening; and
a notch filter configured to enable the quasi chromatic focusing element to focus and transmit light associated with the one or more spectroscopic probe input beams, the one or more spectroscopic probe input beams including at least one spectral band.

13. A wideband tunable spatial noise filter compromising:
a quasi chromatic focusing element configured to receive one or more spectroscopic probe input beams;
a light opening configured to enable the quasi chromatic focused light to pass through the light opening itself; and
a focusing module configured to control focus of the light passed through the light opening;
wherein the wideband tunable spatial noise filter comprises at least a portion of a spectroscopic analysis device configured to perform two stages of spectroscopy, the wideband tunable spatial noise filter further comprising:
collimating optics configured to collimate the quasi chromatic light passed through the light opening, the collimating lens configured to enable spectral analysis; and
a Fabry-Perot interferometer device configured to perform the spectral analysis.

14. The wideband tunable spectral notch spatial noise filter of claim 3, wherein at least one of:
the DC linear motor is configured to enable wideband tuning of the at least a portion of the transmitted light;
the piezo electric actuator is configured to enable fine tuning of the at least a portion of the transmitted light; and
the Micro-Electro-Mechanical Systems (MEMS) light opening photosensor is configured to enable fine tuning of the at least a portion of the transmitted light.

15. The wideband tunable spectral notch spatial noise filter of claim 1, wherein the quasi-chromatic diffractive focusing element comprises at least one of: a tunable lens, a liquid crystal lens, an electrowetting lens, a zoom lens, a voice coil tunable lens, and a stretchable diffractive element made of materials transparent to the input beam spectral band.

16. The wideband tunable spectral notch spatial noise filter of claim 1, wherein the movable or static light opening comprises a pinhole for spherical optics or a slit for cylindrical optics.

17. The wideband tunable spectral notch spatial noise filter of claim 16, wherein the movable or static light opening comprises a diameter or width approaching a best focusing ability of the quasi chromatic diffractive focusing element.

18. The wideband tunable spectral notch spatial noise filter of claim 2, wherein the quasi chromatic diffractive focusing element is configured to perform wideband spectral applications when the dimensions of the outer features are associated with a longer wavelength to be tested.

19. The wideband tunable spectral notch spatial noise filter of claim 1, wherein the wideband tunable spectral notch spatial noise filter is configured to perform one stage spectroscopy, comprising:
a photosensor integrated with a thermoelectric Peltier cooler and an integrated amplifier contained within a mechanical actuator.

20. The wideband tunable spectral notch spatial noise filter of claim 19, wherein the photosensor comprises a wideband operating band material selected from at least one member of a group consisting of: a tunable hybrid pyro detector operating at a wavelength from 0.1 to 1000 µm, a thermopile detector; a PbS detector operating at a wavelength from 150 nm to 2.6 µm; a PbSe detector operating at a wavelength from 150 nm-4.6 µm; and an InGaAs detector operating at a wavelength from 0.9 to 1.6 µm.

21. The wideband tunable spectral notch spatial noise filter of claim 1, wherein the wideband tunable spectral notch spatial noise filter is configured to perform two stage spectroscopy, comprising:
an encapsulated mechanical actuator, collimating focusing optics configured to adjust quasi-chromatic light passed through the movable or static light opening, and a membrane comprising a pinhole MEMS Fabry-Perot interferometer integrated with a photosensor.

22. The wideband tunable spectral notch spatial noise filter of claim 2, comprising a wideband material selected from at least one member of a group consisting of: Zinc Selenide (ZnSe) operating at a wavelength from 0.45 µm to 21.5 µm, Barium Fluoride ($BaF_2$) operating at a wavelength from 0.18 to 14 µm; and Calcium Fluoride ($CaF_2$).

23. A device compromising:
a sieve optical element including a photon sieve or pinhole sieve, the sieve optical element configured to receive one or more spectroscopic input beams and transmit at least a portion of light associated with the one or more spectroscopic input beams; and
a photosensor configured to receive the at least a portion of transmitted light; and a movable light opening configured to enable the photosensor to receive the at least a portion of transmitted light;
wherein the movable light opening is designed to have a diameter or width approaching the diffraction limit of the sieve optical element configured to perform high resolution spectroscopic analysis.

24. The wideband tunable spectral notch spatial noise filter of claim 1, comprising the tunable diffractive element, and wherein the tunable diffractive element comprises a stretchable diffractive element.

* * * * *